(12) United States Patent
Hashimoto

(10) Patent No.: US 8,154,824 B2
(45) Date of Patent: Apr. 10, 2012

(54) LIBRARY DEVICE

(75) Inventor: Kohjiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/926,843

(22) Filed: Dec. 13, 2010

(65) Prior Publication Data

US 2011/0085263 A1 Apr. 14, 2011

Related U.S. Application Data

(63) Continuation of application No. PCT/JP2008/061902, filed on Jul. 1, 2008.

(51) Int. Cl.
*G11B 15/68* (2006.01)
(52) U.S. Cl. ...................................................... 360/92.1
(58) Field of Classification Search .............. 360/92.1, 360/31, 75; 720/630, 645, 718
See application file for complete search history.

(56) References Cited

U.S. PATENT DOCUMENTS

| | | | | |
|---|---|---|---|---|
| 6,026,063 | A * | 2/2000 | Ohba et al. ................ | 369/30.28 |
| 7,753,638 | B2 * | 7/2010 | Ishiyama .................... | 414/280 |
| 2008/0282281 | A1 * | 11/2008 | White ......................... | 720/728 |

FOREIGN PATENT DOCUMENTS

| | | |
|---|---|---|
| JP | 61-73267 | 4/1986 |
| JP | 61-292262 | 12/1986 |
| JP | 10-64144 | 3/1998 |
| JP | 2000-222039 | 8/2000 |
| JP | 2000-306302 | 11/2000 |
| JP | 2001-266438 | 9/2001 |

OTHER PUBLICATIONS

International Search Report for PCT/JP2008/061902, mailed Aug. 12, 2008.
English Translation of the International Preliminary Report on Patentability issued Feb. 17, 2011 in corresponding International Patent Application PCT/JP2008/061902.

* cited by examiner

*Primary Examiner* — Allen Cao
(74) *Attorney, Agent, or Firm* — Staas & Halsey LLP

(57) ABSTRACT

A library device includes: cells each containing a storage medium in a first or a second manner; a medium drive accessing and containing the medium differently from a manner of placing the medium in at least one of the cells; and a medium-transferring unit including a housing section housing the medium, and moving the housing section between the cells and the medium drive to transfer the medium. The unit includes: a support member supporting the housing section pivotably between a first and a second postures meeting the first and second manners; a movement-controlling system moving the support member so that the housing section faces the cells and medium drive; a medium-transferring system transferring the medium; a biasing member biasing the housing section toward the first posture; and a posture-changing member interfering with and thereby pivoting the housing section from the first posture to the second posture resisting the biasing member.

5 Claims, 27 Drawing Sheets

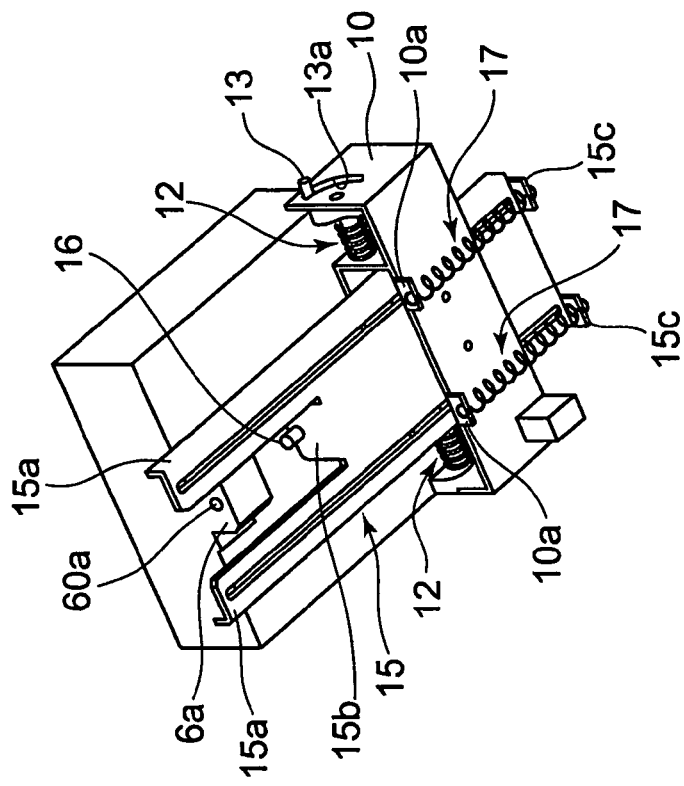
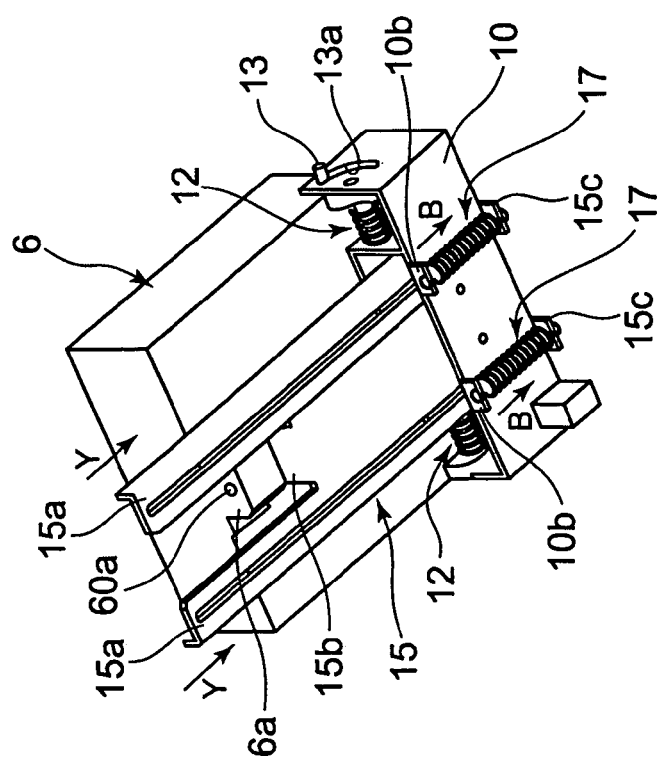
FIG. 12A
FIG. 12B

LIBRARY DEVICE

CROSS-REFERENCE TO RELATED APPLICATION

This is a continuation application of PCT/JP2008/061902, filed on Jul. 1, 2008.

FIELD

The embodiments discussed herein are related to a library device that includes plural cells each containing a storage medium, a medium drive accessing the contained storage medium, and a medium-transferring unit transferring the storage medium between the plural cells and the medium drive.

BACKGROUND

In recent years, as information technology has progressed, techniques related to storage media that store information in form of electronic data have advanced rapidly. Among the storage media, a large-capacity storage medium such as a magneto-optical disk and a magnetic tape is often used for data backup by using the large storage capacity. In particular, when data on ever-changing information such as transaction information of banks and securities is continuously backed up, the amount of data for backup (backup data) to be generated is enormous. In such a case, generally, large-capacity storage media are used, backup data is written into the storage media, and the storage media storing the backup data are kept. Here, conventionally, a library device has been known as a device suitable for managing such a large amount of backup data, and various kinds of library device have been proposed in Japanese Patent Laid-open Publications No. 2000-222039, No. H10-64144, No. S61-292262 and No. S61-73267.

The library device includes: plural cells each containing a storage medium, a drive accessing the contained storage medium (writing and reproducing data), and a robot transferring the storage medium between the drive and the cells. The robot includes a housing section that houses the storage medium. The robot retrieves a desired storage medium from the cell and houses the storage medium in the housing section. Subsequently, the robot transfers the housed storage medium to the drive, and returns the storage medium to the cell by transferring the storage medium again, after the storage medium is accessed by the drive. In this way, in the library device, a large amount of data is sequentially written into the storage media and kept in the plural cells and thus, management of a large amount of backup data is efficiently carried out.

Here, in many of conventional library devices, cells and a drive are fixed to a frame (part of a housing) such that the orientation (the way of placing) of a storage medium contained in each cell and the orientation (the way of placing) of a storage medium contained in the drive are the same. As the orientation of the cells and the drive, generally, either a horizontal orientation or a vertical orientation is adopted according to the way the storage medium is placed.

FIG. 1 and FIG. 2 are diagrams each illustrating an example of the arrangement of cells and drives in a conventional library device.

FIG. 1 is a diagram that illustrates an example of the arrangement of cells and drives in a conventional library device 100' that employs the horizontal orientation, and FIG. 2 is a diagram that illustrates an example of the arrangement of cells and drives in a conventional library device 200' that employs the vertical orientation.

In the arrangement of FIG. 1, the horizontal orientation is adopted as the way of placing a storage medium 1. FIG. 1 illustrates the storage medium 1 contained in each of four of cells 2 in the horizontal orientation and the storage medium 1 housed in a housing section 3a of one of drives 3 in the horizontal orientation, within a frame 101'. In this way, to be matched with the horizontal orientation adopted as the way of placing the storage medium 1, the cells 2 and the drives 3 are disposed in the horizontal orientation.

On the other hand, in the arrangement of FIG. 2, the vertical orientation is adopted as the way of placing a storage medium 1. FIG. 2 illustrates the storage medium 1 contained in each of four of cells 2 in the vertical orientation and the storage medium 1 housed in a housing section 3a of one of drives 3 in the vertical orientation, within a frame 201'. In this way, to be matched with the vertical orientation adopted as the way of placing the storage medium 1, the cells 2 and the drives 3 are disposed in the vertical orientation.

In either of the arrangement in FIG. 1 and the arrangement in FIG. 2, a not-illustrated robot retrieves a desired storage medium from the cell, houses the retrieved storage medium in the housing section, transfers the housed storage medium to the drive, and returns the storage medium to the cell by transferring the storage medium again after the storage medium is accessed by the drive, so that backup data is managed efficiently.

In recent years, in the field of library device, a standardized frame available on the market has been adopted as a frame of the library device, and members and units such as cells, drives and a robot have been disposed within the frame, in many cases. In a case in which the standardized frame is thus adopted as the frame of the library device, when the cell and the drive are disposed in the same orientation, wasted space may be formed.

For example, in the arrangement of FIG. 1, within the frame 101', there is space 5 on the left side in FIG. 1. This space 5 is so small in the width in a lateral direction in FIG. 1 that it is difficult to dispose the cells 2 and the drives 3 in the space 5 in the horizontal orientation. Also, in the arrangement of FIG. 2, within the frame 201', there is space 5' on the lower side in FIG. 1. This space 5' is so small in the width in a vertical direction in FIG. 2 that it is difficult to dispose the cells 2 and the drives 3 in the space 5' in the vertical orientation.

In the field of library device, demand for a library device that holds a large amount of information without a large device volume is growing, and an idea of arranging cells and drives densely so that storage media are accommodated as many as possible within a limited device volume is desired. When there is wasted space like the space 5 in FIG. 1 and the space 5' in FIG. 2, it is difficult to realize such a high-density arrangement.

It is conceivable to densely arrange the cells and the drives by mixing the vertical orientation and the horizontal orientation of the cells and the drives, and separately provide the robot with a function of changing the orientation of the housing section by using a drive system that employs a motor to meet such a mixture of the orientations. However, when such a drive system is provided, a control system for controlling this drive system is desired to be newly added, which may lead to an increase in cost.

SUMMARY

According to one aspect of the invention, a library device includes:

a frame;

a plurality of cells provided in the frame and each containing a storage medium removably in at least one of a first placement manner and a second placement manner different from the first placement manner;

a medium drive provided in the frame and accessing the storage medium contained in the cell; and a medium-transferring unit that includes a housing section housing the storage medium removably, and moves the housing section between the plurality of cells and the medium drive, thereby transferring the storage medium between the plurality of cells and the medium drive, wherein the medium drive contains the storage medium in a second-type placement manner different from a first-type placement manner that is, of the first placement manner and the second placement manner, a manner of placing a storage medium contained in at least one of the plurality of cells, and the medium-transferring unit further includes:
- a support member that supports the housing section pivotably between a first posture in which the housing section houses the storage medium in one of the first placement manner and the second placement manner and a second posture in which the housing section houses the storage medium in the other of the first placement manner and the second placement manner;
- a movement-controlling system that causes the support member to move to a position where the housing section faces each of the plurality of cells and the medium drive;
- a medium-transferring system that transfers the storage medium between each of the plurality of cells and the housing section and between the medium drive and the housing section;
- a biasing member that biases the housing section to be in the first posture; and
- a posture-changing member that interferes with the housing section when the housing section moves and reaches a predetermined position, and causes the housing section to pivot from the first posture to the second posture by resisting a biasing force produced by the biasing member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12A and FIG. 12B are diagrams that illustrate the hand section, the plate and the hand base when viewed from the underside (undersurface) in FIG. 10.

DESCRIPTION OF EMBODIMENTS

Specific embodiments of the library device whose one aspect has been described above will be described below with reference to the drawings. As the specific embodiments, a first embodiment and a second embodiment will be described as follows.

First, the first embodiment will be described.

Figure 3:
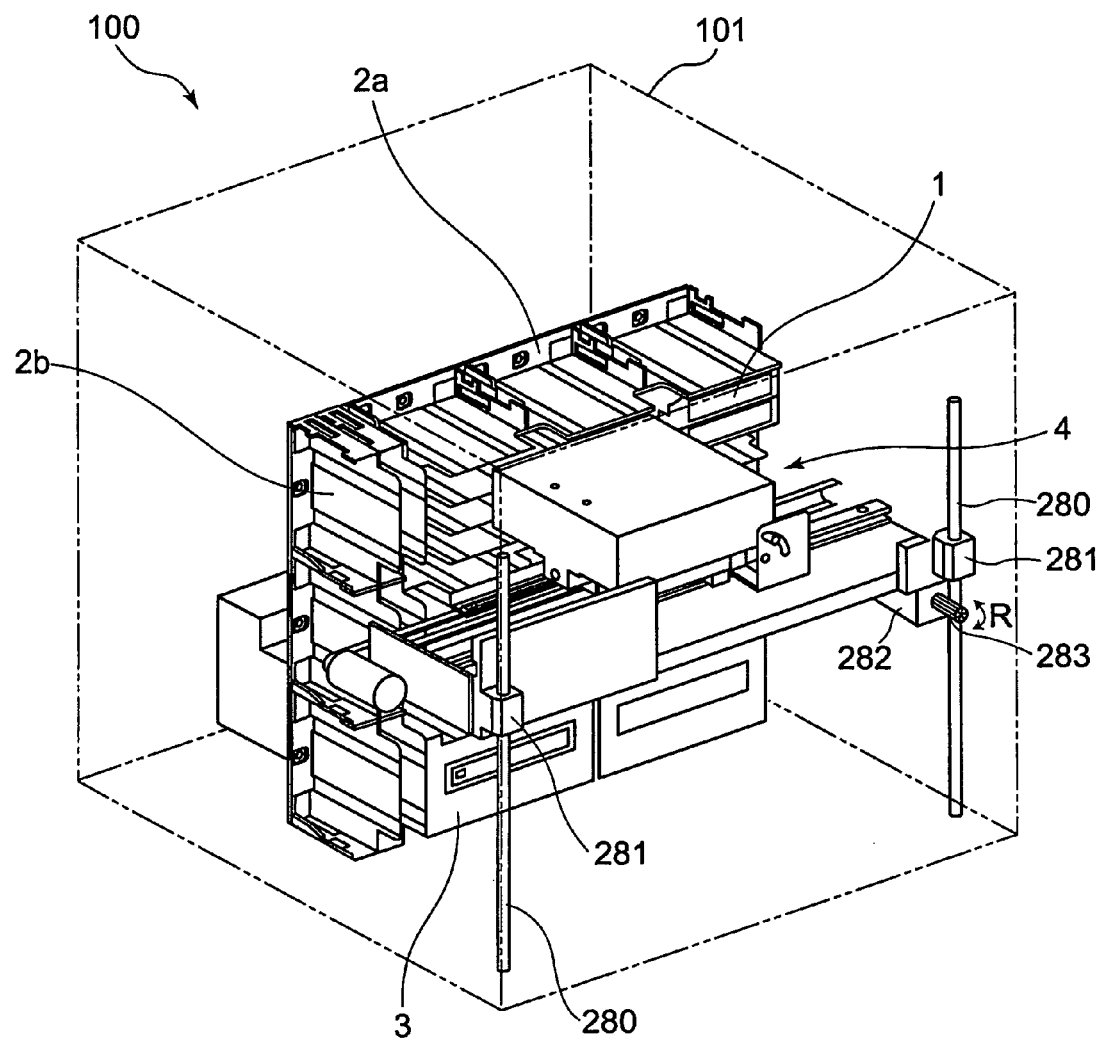
FIG. 3 is an external perspective view of a library device of a first embodiment.

FIG. 3 is an external perspective view of a library device 100 of the first embodiment.

In the library device 100 of the first embodiment, there are provided, inside a frame 101, horizontally-oriented cells 2a that contain storage media in a horizontal position and vertically-orientated cells 2b that contain storage media in a vertical position. Each of the cells 2a and the cells 2b contains one storage medium. In FIG. 3, a storage medium 1 contained in the horizontally-oriented cell 2a is illustrated. Incidentally, the horizontally-oriented cells 2a and the vertically-oriented cells 2b are provided with different reference characters, but the cells 2a and 2b are the same except that the orientations are different. Further, the library device 100 includes two drives 3 that are horizontally-oriented drives in each of which the storage medium in a horizontally-oriented state is to be housed. Here, the plural cells 2a and 2b and the two drives 3 are fixed to the frame 101. Further, the library device 100 includes a robot 4 that transfers the storage medium between the cells 2a or 2b and the drives 3.

Figure 4:
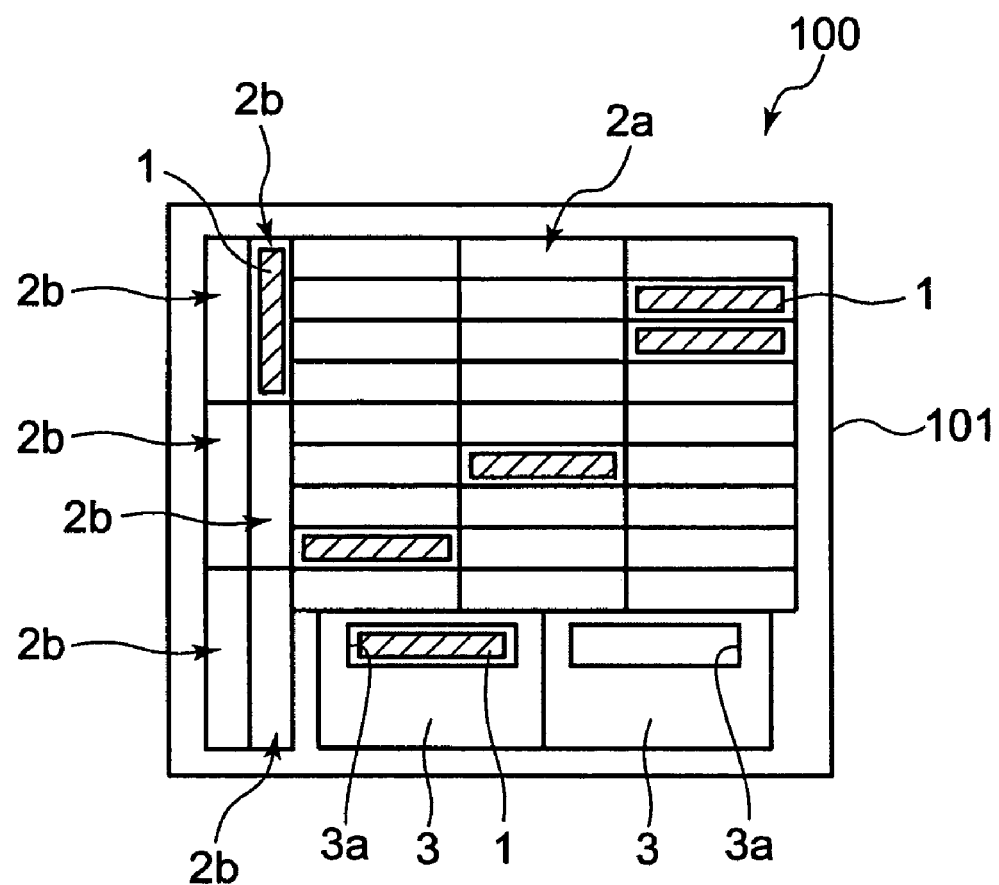
FIG. 4 is a diagram that illustrates an arrangement of the cells and the drives in the library device in FIG. 3.

FIG. 4 is a diagram that illustrates an arrangement of the cells and the drives in the library device 100 in FIG. 3.

Figure 1:
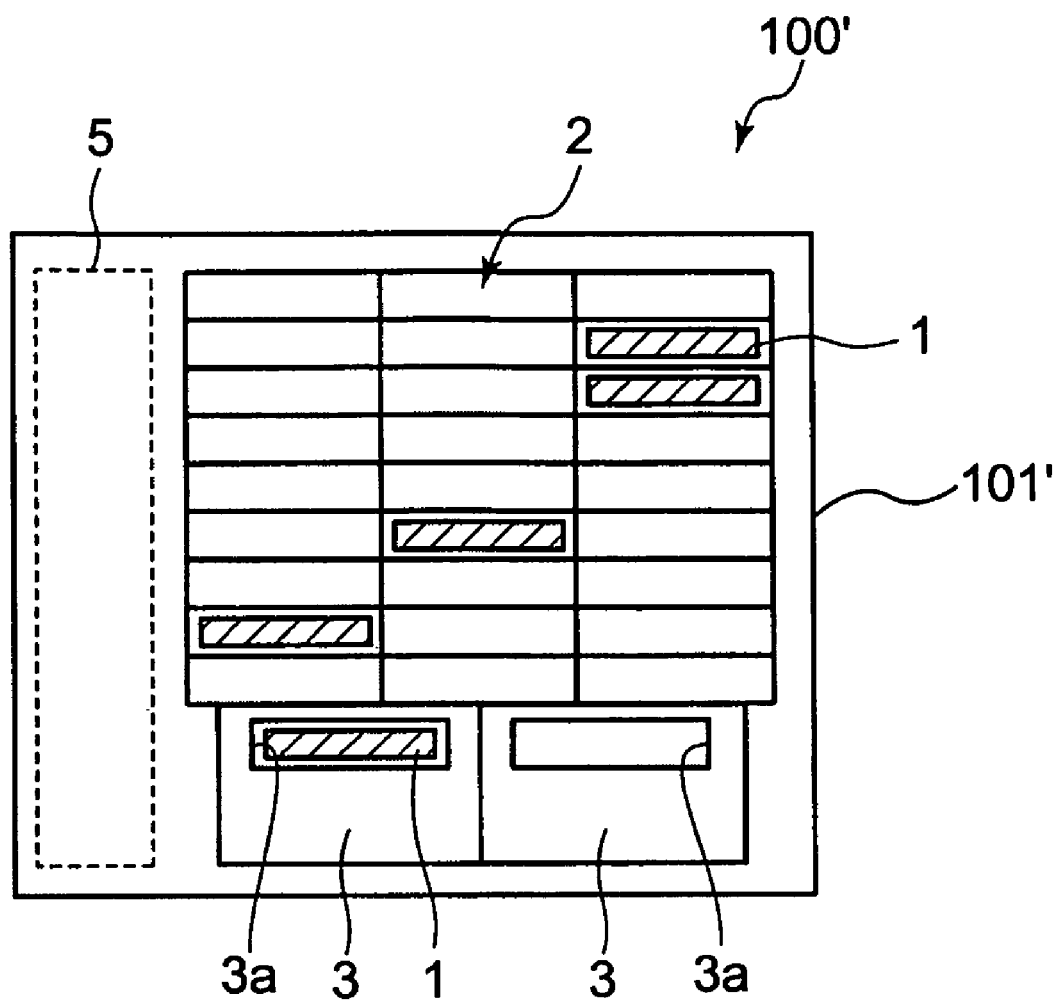
FIG. 1 is a diagram illustrating an example of the arrangement of cells and drives in a conventional library device.
Figure 2:
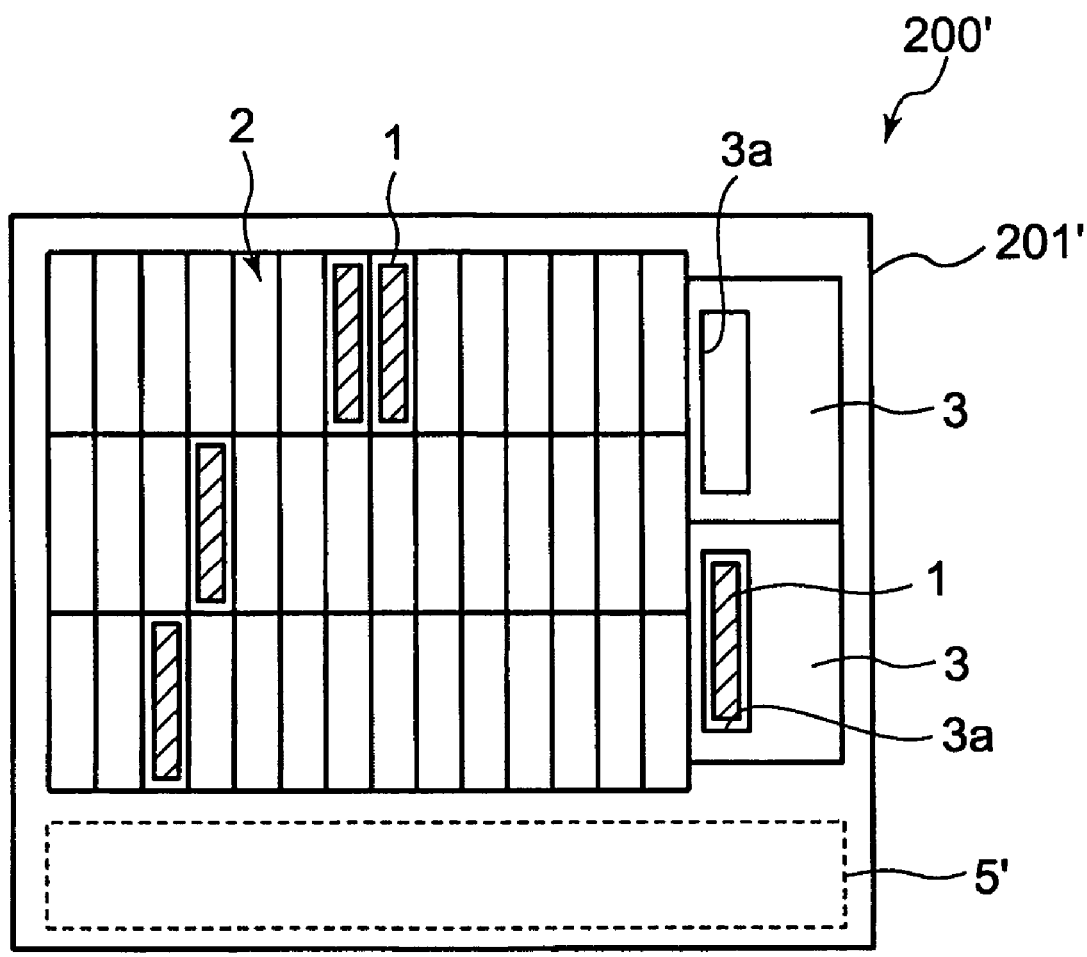
FIG. 2 is a diagram illustrating an example of the arrangement of cells and drives in the conventional library device.

As illustrated in FIG. 4, in the library device 100, both horizontal placement and vertical placement are employed as the way of placing the storage medium 1. FIG. 4 illustrates, in the frame 101, the storage media 1 horizontally placed and contained in the horizontally-oriented cells 2a and the storage medium 1 vertically placed and contained in the vertically-oriented cell 2b. Further, FIG. 4 also illustrates the storage medium 1 horizontally placed and housed in a housing section 3a of the drive 3 on the left side in FIG. 1 of the two horizontally-oriented drives 3.

As illustrated in FIG. 4, the library device 100 of the first embodiment is a library device in which the number of the horizontally-oriented cells 2a is larger than the number of the vertically-oriented cells 2b, and a greater density in the arrangement of the cells is achieved by arranging the vertically-oriented cells 2b in available space that is formed when the horizontally-oriented cells 2a are arranged as many as possible within the frame 101. Here, the vertically-oriented cells 2b are arranged to be concentrated on one side (the left side in FIG. 4) of the library device 100.

Figure 5:
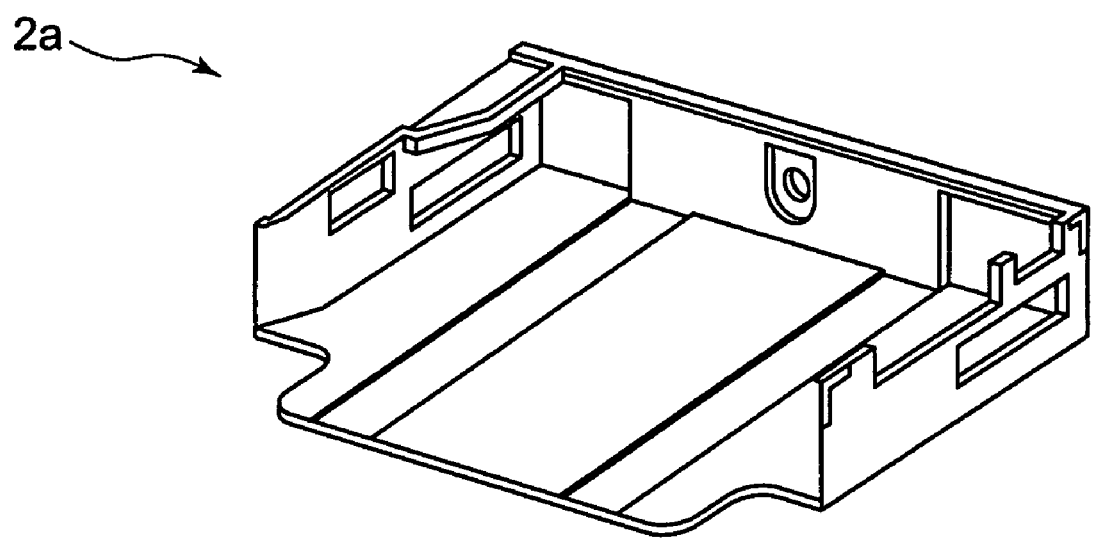
FIG. 5 is a diagram that illustrates the cell in FIG. 3 and FIG. 4.
Figure 6:
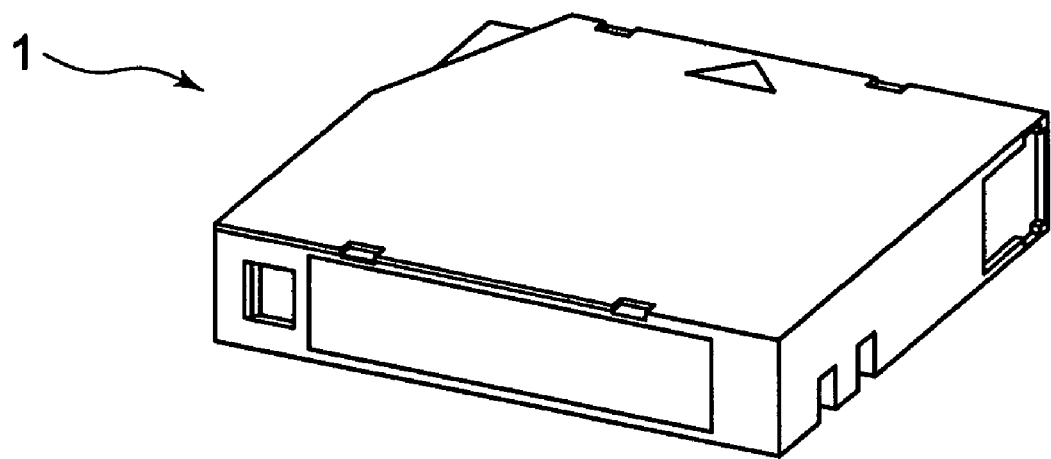
FIG. 6 is a diagram that illustrates the storage medium in FIG. 3 and FIG. 4.
Figure 7:
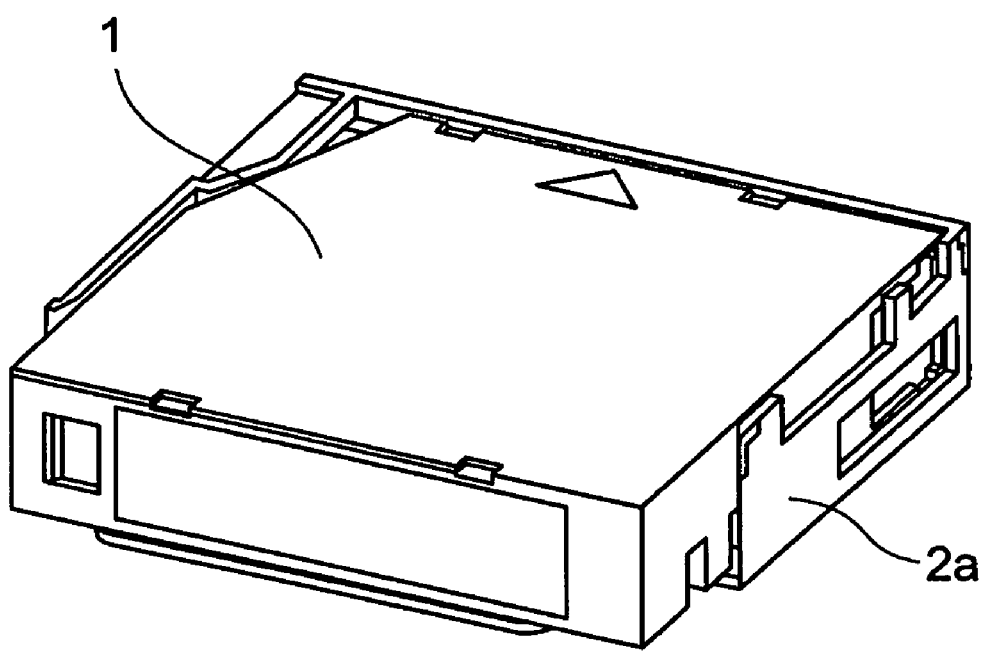
FIG. 7 is a diagram that illustrates the cell containing the storage medium in FIG. 6.

FIG. 5 is a diagram that illustrates the cell 2a in FIG. 3 and FIG. 4, FIG. 6 is a diagram that illustrates the storage medium 1 in FIG. 3 and FIG. 4, and FIG. 7 is a diagram that illustrates the cell 2a containing the storage medium 1 in FIG. 6.

As illustrated in FIG. 5, the cell 2a is shaped like a tray. Incidentally, as mentioned earlier, the vertically-oriented cell 2b and the horizontally-oriented cell 2a illustrated in FIG. 3 and FIG. 4 are the same except that the orientations are different, and the vertically-oriented cell 2b is also shaped like a tray as illustrated in FIG. 5. As illustrated in FIG. 6, the storage medium 1 is shaped like a thick rectangular plate. Here, the above-mentioned horizontal placement refers to a way of placing the storage medium 1 when the storage medium 1 is placed in a state in which a surface spreading like a plate (a horizontally spreading surface in FIG. 6) of the storage medium 1 is parallel to a lateral direction and a depth direction in FIG. 3, in the library device 100 in FIG. 3. Also, the above-mentioned vertical placement refers to a way of placing the storage medium 1 when the storage medium 1 is placed in a state in which the surface spreading like a plate (the horizontally spreading surface in FIG. 6) of the storage medium 1 is parallel to a vertical direction and the depth direction in FIG. 3. As illustrated in FIG. 7, when the storage medium 1 in FIG. 6 is contained in the cell 2a in FIG. 5, the storage medium 1 is fitted into the cell 2a shaped like a tray.

Next, the robot 4 illustrated in FIG. 3 will be described.

Figure 8A:
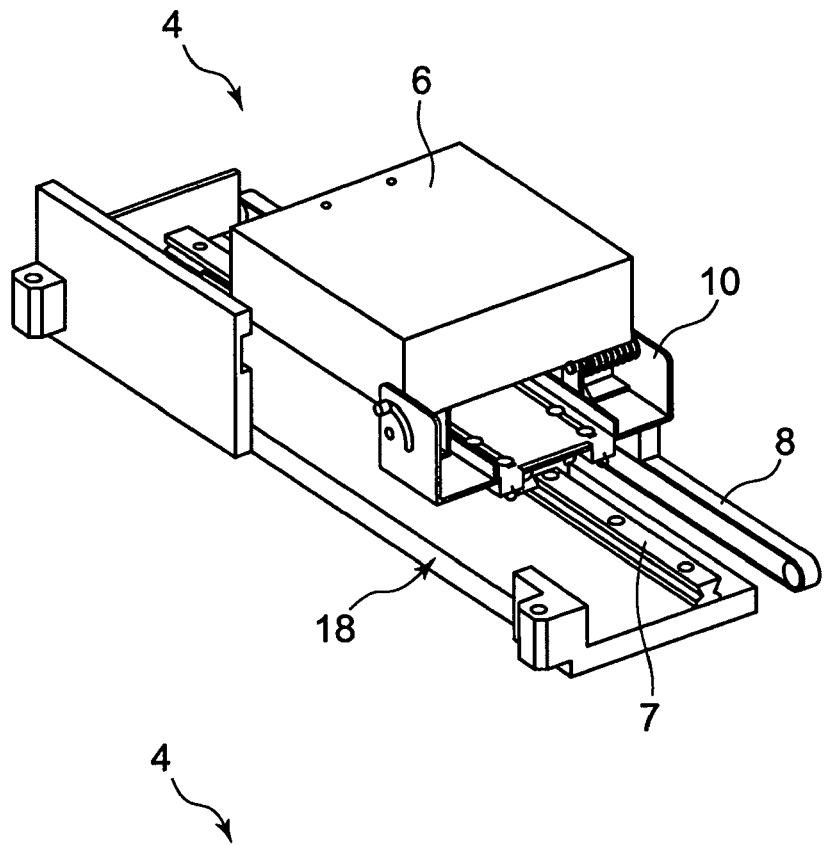
FIG. 8A and FIG. 8B are diagrams that illustrate the robot depicted in FIG. 3.
Figure 8B:
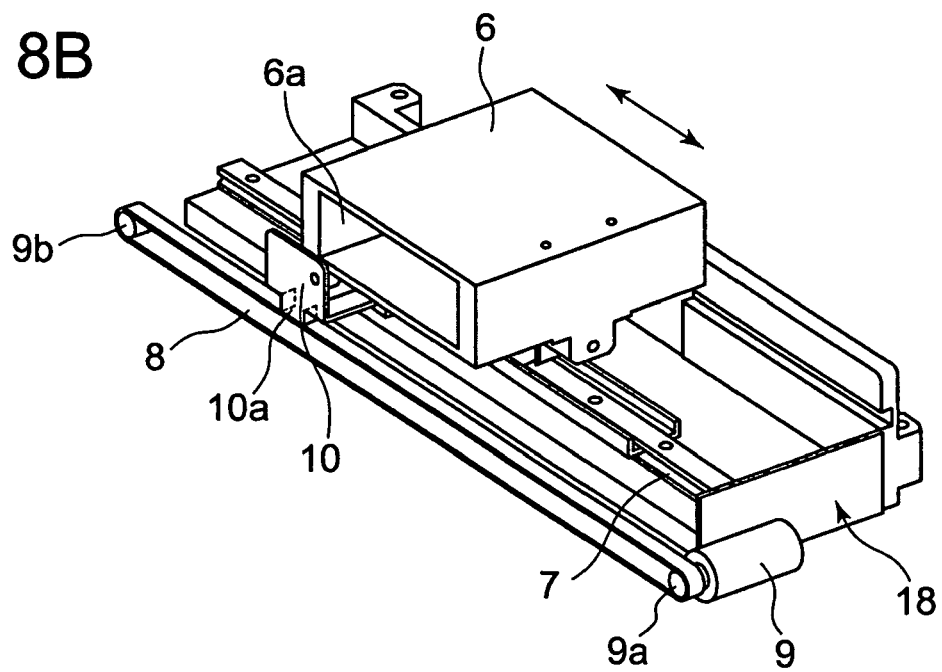

FIG. 8A and FIG. 8B are diagrams that illustrate the robot 4 depicted in FIG. 3.

FIG. 8A is an overview diagram of the robot 4 when the robot 4 is viewed from a right front side to a left rear side in FIG. 3, and FIG. 8B is an overview diagram of the robot 4 when the robot 4 is viewed from the left rear side to right front side in FIG. 3.

As illustrated in FIG. 8A, the robot 4 includes a hand section 6, a hand base 10 and a robot base 18.

The hand section 6 serves to: transfer the storage media 1 between the cells 2a, 2b and the drives 3; retrieve the storage medium 1 from the cells 2a, 2b as well as put the storage medium 1 in the cells 2a, 2b; and retrieve the storage medium 1 from the drive 3 as well as put the storage medium 1 in the drive 3. As illustrated in FIG. 8B, the hand section 6 has a housing section 6a that houses the storage medium 1, and this housing section 6a is open outside the hand section 6. Here, an opening of this housing section 6a is directed toward where the cells 2a and 2b and the drives 3 illustrated in FIG. 3 are arranged (in a right backward direction in FIG. 8B and also a left frontward direction in FIG. 8B). As will be describe later, this hand section 6 is supported in a state of being rotatable, relative to the hand base 10, within a plane spreading in two directions, namely, a vertical direction in FIG. 8A and FIG. 8B and a direction linking a right front side and a left rear side. As illustrated in FIG. 8B, a guide rail 7 is provided on the robot base 18, and the hand base 10 travels together with the hand section 6 on this guide rail 7 in a direction indicated by a double-headed arrow in FIG. 8B. As a drive system to realize such traveling, of the hand base 10, the robot 4 includes a horizontal-movement motor 9 and a belt 8. The belt 8 is held by a rotating section 9a and a roller 9b of the horizontal-movement motor 9, and part of the belt 8 is fixed to a connection section 10a at a lower part of the hand base 10. When the rotating section 9a of the horizontal-movement motor 9 rotates, the belt 8 moves by following the rotation of the rotating section 9 while rotating the roller 9b. By this following movement, the hand base 10 travels on the guide rail 7.

Figure 9:
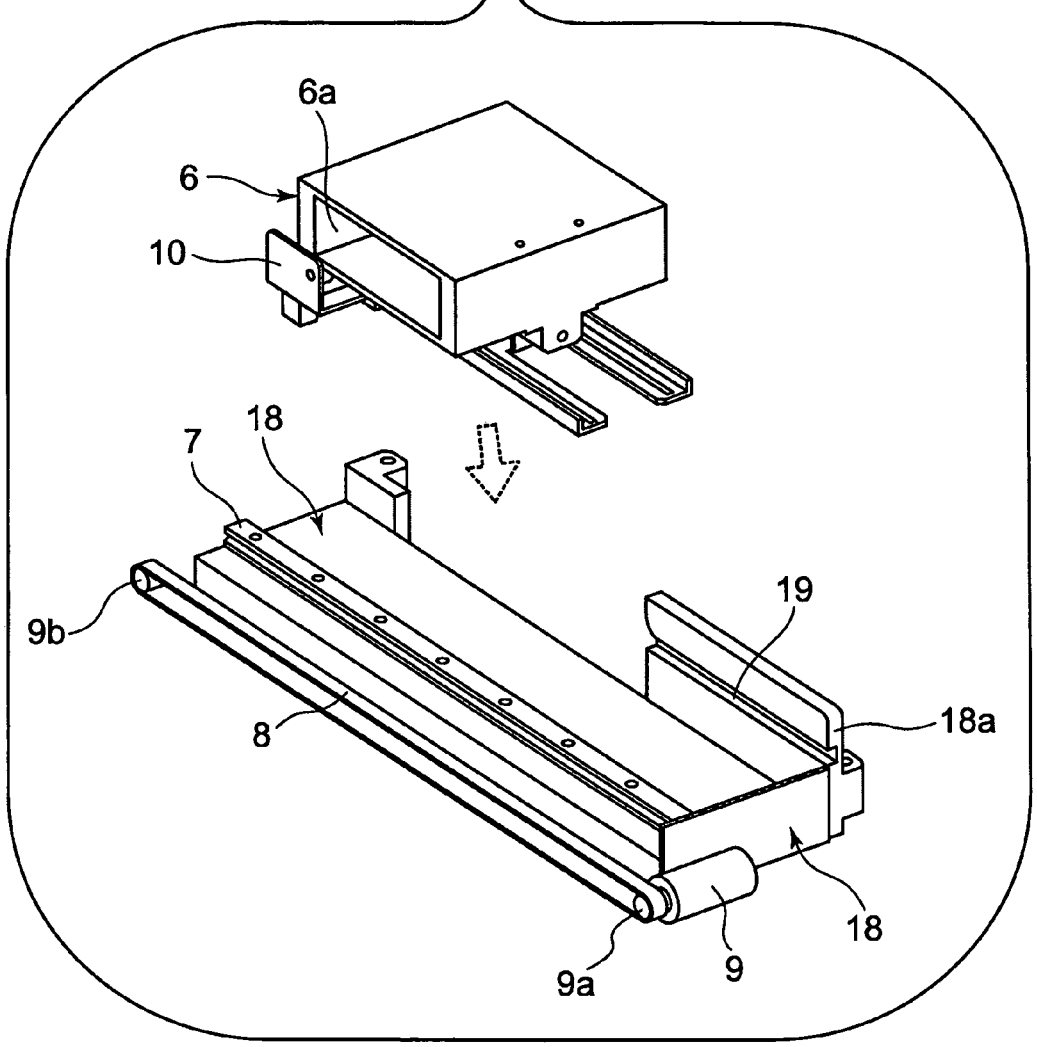
FIG. 9 is a diagram that illustrates the robot depicted in FIG. 8B, by separating a part including a hand section and a hand base from a part including a robot base and a horizontal-movement motor.

FIG. 9 is a diagram that illustrates the robot 4 depicted in FIG. 8B, by separating a part including the hand section 6 and the hand base 10 from a part including the robot base 18 and the horizontal-movement motor 9.

The part including the hand section 6 and the hand base 10 illustrated in an upper part of FIG. 9 is a part that travels by the drive system of the hand base 10, while the part including the robot base 18 and the horizontal-movement motor 9 illustrated in a lower part of FIG. 9 is a part that remains still relative to the hand base 10 when the hand base 10 travels. Incidentally, FIG. 9 illustrates a side wall 18a provided in the robot base 18 along a direction in which the guide rail 7 extends, and also illustrates a groove 19 formed on a surface on the guide rail 7 side of this side wall 18a and extending in parallel with the direction of the guide rail 7. The action of this groove 19 will be described later.

The robot base 18 does not move in the horizontal direction in FIG. 3. However, the robot base 18 moves in the vertical direction in FIG. 3. Here, a moving system in this vertical direction will be described. The robot base 18 in FIG. 3 has two grip sections 281, and these grip sections 281 are connected to two columns 280 in a state of being movable in the vertical direction. To an undersurface of the robot base 18, a vertical-movement motor 282 is fixed, and a rotating section 283 of the vertical-movement motor 282 is in contact with the column 280 on the right side in FIG. 3. Due to such a structure, when the rotating section 283 of the vertical-movement motor 282 rotates in a direction indicated by a double-headed arrow R in FIG. 3, the robot base 18 moves in the vertical direction in FIG. 3 along the two columns 280. In this movement in the vertical direction, the hand section 6 and the hand base 10 move in the vertical direction in FIG. 3 together with the robot base 18.

In the robot 4, the robot base 18 moves in the vertical direction in FIG. 3 and further, the hand base 10 moves on the robot base 18, so that the hand section 6 approaches the desired cell 2a, 2b or drive 3. In this approached state, the storage medium 1 is transferred between the desired cell 2a, 2b or drive 3 and the hand section 6. Here, as will be described later, the hand section 6 pivots within a plane spreading in the direction in which the guide rail 7 extends and the vertical direction in FIG. 8, and at the time of the above-mentioned transfer, the hand section 6 takes a horizontally-oriented posture to house the storage medium 1 in a horizontally-placed state or takes a vertically-oriented posture to house the storage medium 1 in a vertically-placed state, depending on whether the orientation of the desired cell 2a, 2b or drive 3 is horizontal or vertical. FIG. 8A and FIG. 8B illustrate a state in which the hand section 6 is in the horizontally-oriented posture of these two postures.

Here, the combination of the robot 4 and the two columns 280 is equivalent to an example of the medium-transferring unit in the library device having the one aspect described above. Further, the combination of the hand base 10 and a plate 15 is equivalent to an example of the support member in the library device having the one aspect described above, and the combination of the two columns 280, the vertical-movement motor 282, the belt 8, the roller 9b and the horizontal-movement motor 9 is equivalent to an example of the movement-controlling system in the library device having the one aspect described above. Furthermore, the hand section 6 is equivalent to an example of the medium-transferring system in the library device having the one aspect described above, and the housing section 6a is equivalent to an example of the housing section in the library device having the one aspect described above.

Next, the part including the hand section 6 and the hand base 10 illustrated in the upper part of FIG. 9 will be described.

Figure 10:
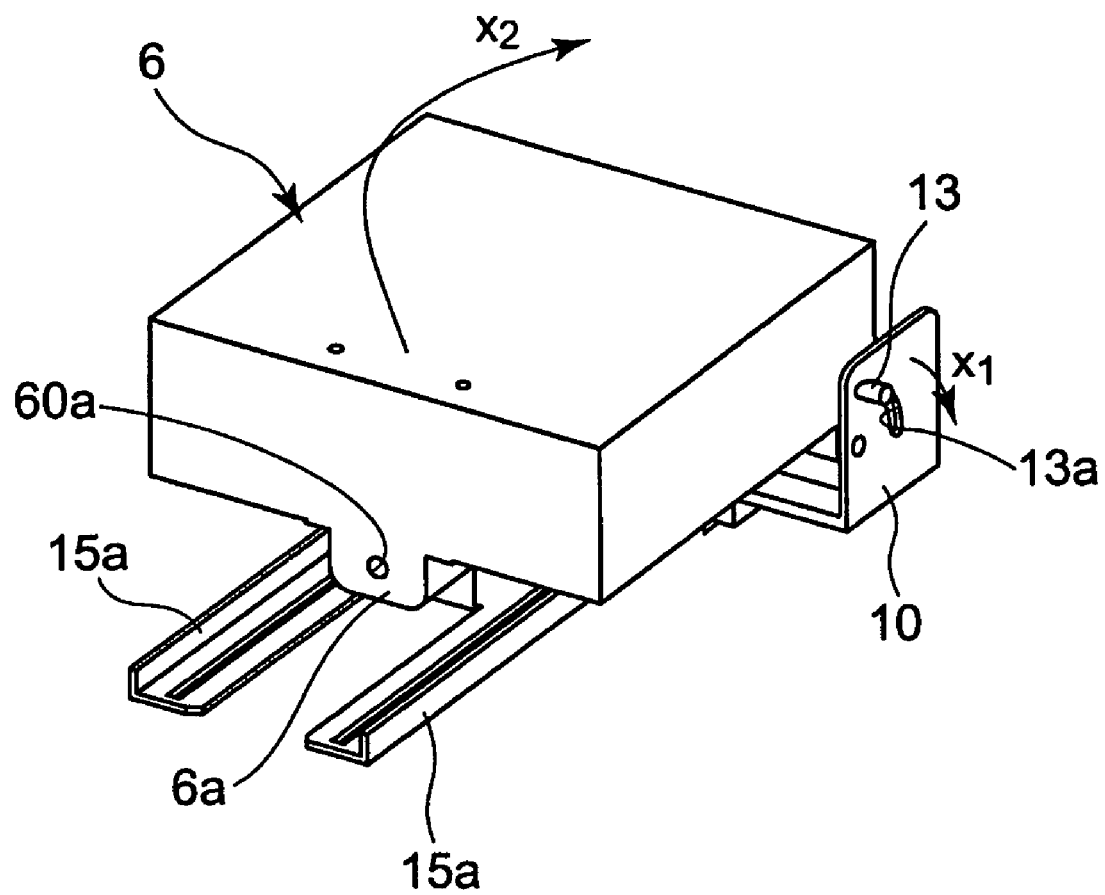
FIG. 10 is a diagram that illustrates the part including the hand section and the hand base illustrated in the upper part of FIG. 9.
Figure 11:
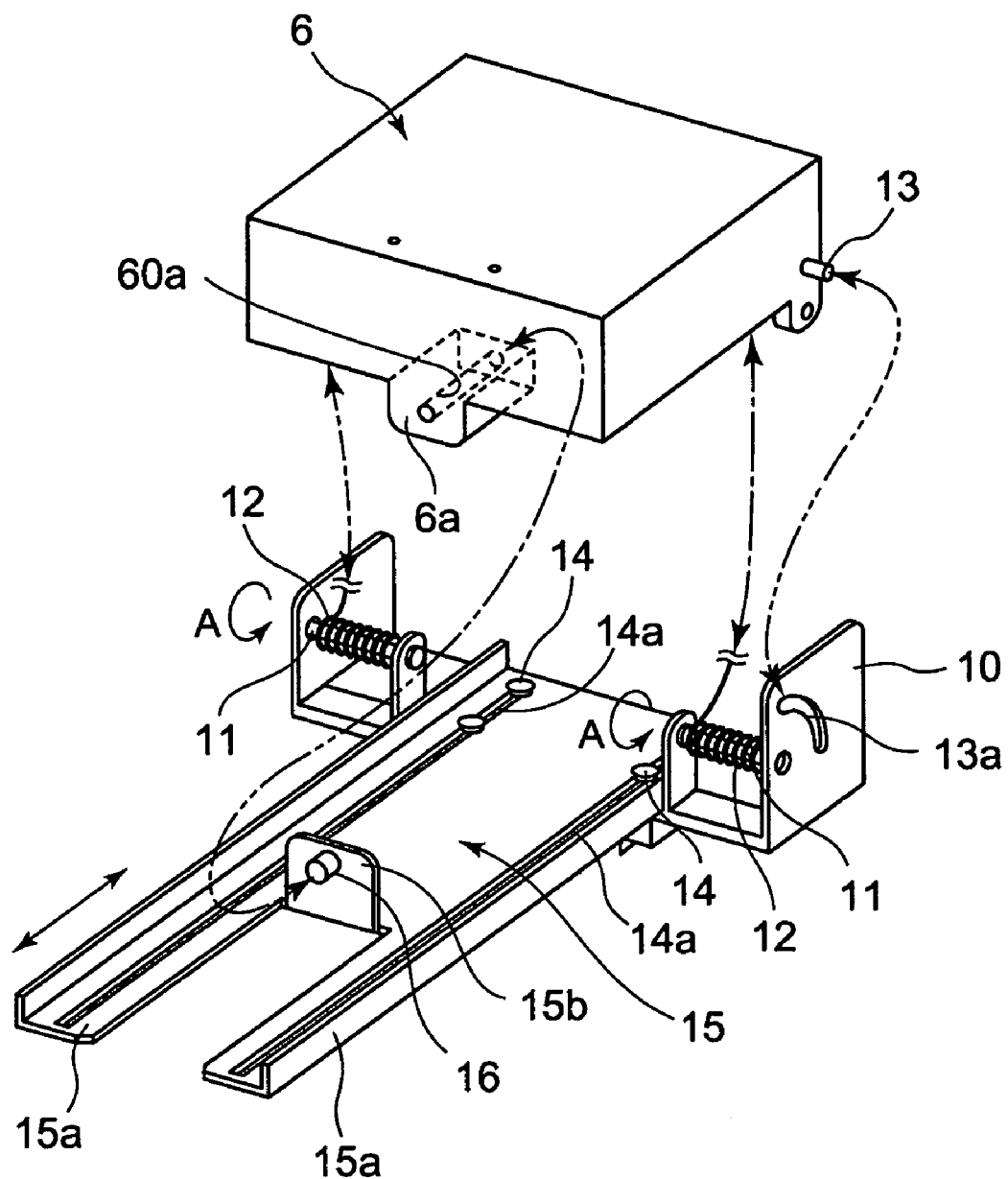
FIG. 11 is an exploded view of the structure of the part illustrated in FIG. 10.

FIG. 10 is a diagram that illustrates the part including the hand section 6 and the hand base 10 illustrated in the upper part of FIG. 9, and FIG. 11 is an exploded view of the structure of the part illustrated in FIG. 10.

The part including the hand section 6 and the hand base 10 illustrated in FIG. 10 includes, in addition to the hand section 6 and the hand base 10, the plate 15 illustrated in FIG. 11. The part illustrated in FIG. 10 has such a structure that the plate 15 is disposed on the hand base 10 and further the hand section 6 is disposed on the plate 15.

As illustrated in FIG. 11, the hand section 6 includes a pin 13 provided on a side facing rightward in FIG. 11, the pin 13 protrudes in a direction perpendicular to this side. Further, on an undersurface facing the plate 15 (an underside in FIG. 11) of the hand section 6, a convex section 6a protruding downward in FIG. 11 is provided. Here, formed in this convex section 6a is a through hole 60a that penetrates the convex section 6a in a direction linking a right rear side and a left front side in FIG. 11.

Of the plate 15, a part extending toward the left front side in FIG. 10 and FIG. 11 bifurcates into two to form two slide sections 15a. When the upper part in FIG. 9 (the part illustrated in FIG. 10) is disposed on the lower part in FIG. 9, these two slide sections 15a are placed to have the guide rail 7 in FIG. 8B interposed in between as illustrated in FIG. 8B. Thus, there is realized a state in which the upper part in FIG. 9 (the part illustrated in FIG. 10) travels on the robot base 18 only in the direction in which the guide rail 7 extends. In the plate 15, as illustrated in FIG. 11, a protruding plate section 15b shaped like a plate and protruding upward in FIG. 11 is formed near a portion bifurcated into the two slide sections 15a. The protruding plate section 15b has a surface facing the left front side in FIG. 11, and on this surface, a lock pin 16 protruding toward the left front side in FIG. 11 is provided. The hand section 6 in the horizontally-oriented state as illustrated in FIG. 10 is disposed on the plate 15, this lock pin 16 is inserted into the through hole 60a formed in the convex section 6a of the hand section 6 as indicated by a chain double-dashed line in FIG. 11. Further, in the plate 15, there are provided two guiding groove sections 14a in which two grooves are formed respectively. These guiding groove sections 14a extend straight from a part near an edge of the plate 15 on the right rear side to a part near the tips of the two slide sections 15. A guide pin 14 is inserted into each of the grooves of the respective two guiding groove sections 14a and connected to the hand base 10. Incidentally, in FIG. 11, only a head portion of the guide pin 14 inserted into the guiding groove section 14a is illustrated. In addition, of the hand base 10, a part to which the guide pin 14 is connected is below the plate 15 and thus invisible in FIG. 11. Due to the presence of this guide pin 14, the direction in which the plate 15 moves relative to the hand base 10 is limited to a direction indicated by a double-headed arrow in FIG. 11 along the direction in which the guiding groove section 14a extends.

As illustrated in FIG. 11, on both sides of the plate 15, the hand base 10 has two opposed tabular parts between which the plate 15 is interposed and which spread in a vertical direction in FIG. 11 and the direction in which the guiding groove section 14a extends. Of these two tabular parts, a right tabular part has a curved opening section 13a in which a curved opening is formed. As indicated by a double-headed arrow formed by a triple-dashed line in FIG. 11, the pin 13 of the hand section 6 is inserted into the opening of this curved opening section 13a from left to right. Here, as illustrated in FIG. 10, when the hand section 6 is in a state of being horizontally oriented relative to the hand base 10 and the plate 15, the pin 13 is located in an upper part of the curved opening section 13a as illustrated in FIG. 10.

Further, in the hand base 10, rotation springs 12 are respectively provided on both sides of the plate 15, and each of the rotation springs 12 is wound around each shaft 11 that is a part of the hand base 10. Each of these two rotation springs 12 has one end fixed to the shaft 11, and the another end is connected to the undersurface of the hand section 6 as indicated by a double-headed arrow formed by alternate long and short dashed lines in FIG. 11. By these two rotation springs 12, the hand section 6 is biased to pivot in a direction indicated by arrows A in FIG. 11 by using the shaft 11 as an axis. Here, in the state in which the hand section 6 is oriented horizontally as illustrated in FIG. 10, this biasing force serves as a force to hold the hand section 6 in the horizontally-orientated state relative to the hand base 10 and the plate 15.

Here, the rotation spring 12 is equivalent to an example of the biasing member in the library device having the one aspect described above.

FIG. 12A and FIG. 12B are diagrams that illustrate the hand section 6, the plate 15 and the hand base 10 when viewed from the underside (undersurface) in FIG. 10.

As illustrated in FIG. 12A, two pressing springs 17 are provided on the underside (undersurface) of the hand section 6, the plate 15 and the hand base 10 illustrated in FIG. 10. One end of the pressing spring 17 is connected to a spring connector 10a that is a part of the hand base 10, and the other end of the pressing spring 17 is connected to a plate end section 15c that is an end portion of the plate 15. Due to the elasticity of this pressing spring 17, a force for making the spring connector 10a and the plate end section 15c approach each other (a force for causing shrinkage) acts between the spring connector 10a and the plate end section 15c. This force makes the plate 15 resist being detached from the hand base 10. As a result, the lock pin 16 in FIG. 11 resists being removed from the through hole 60a, and the state of the lock pin 16 being inserted into the through hole 60a is stabilized.

Here, in the state illustrated in FIG. 12A, when an external force for pushing the plate 15 in directions indicated by arrows Y illustrated in FIG. 12A relative to the hand base 10 is applied, the two plate end sections 15c are moved by this external force in the directions indicated by the arrows Y while pulling the two pressing springs 17 in directions indicated by arrows B. As a result, a state illustrated in FIG. 12B is realized. In the state of FIG. 12B, the lock pin 16 is in a state of being removed from the through hole 60a as illustrated in FIG. 12B.

In the state in which the lock pin 16 is removed from the through hole 60a, when the pin 13 in FIG. 10 is depressed in an arrow $x_1$ direction in FIG. 10 along the curved opening section 13a by another external force, the hand section 6 pivots in an arrow $x_2$ direction in FIG. 10 by accompanying the depression of this pin 13 and results in a vertically-orientated state.

Figure 13:
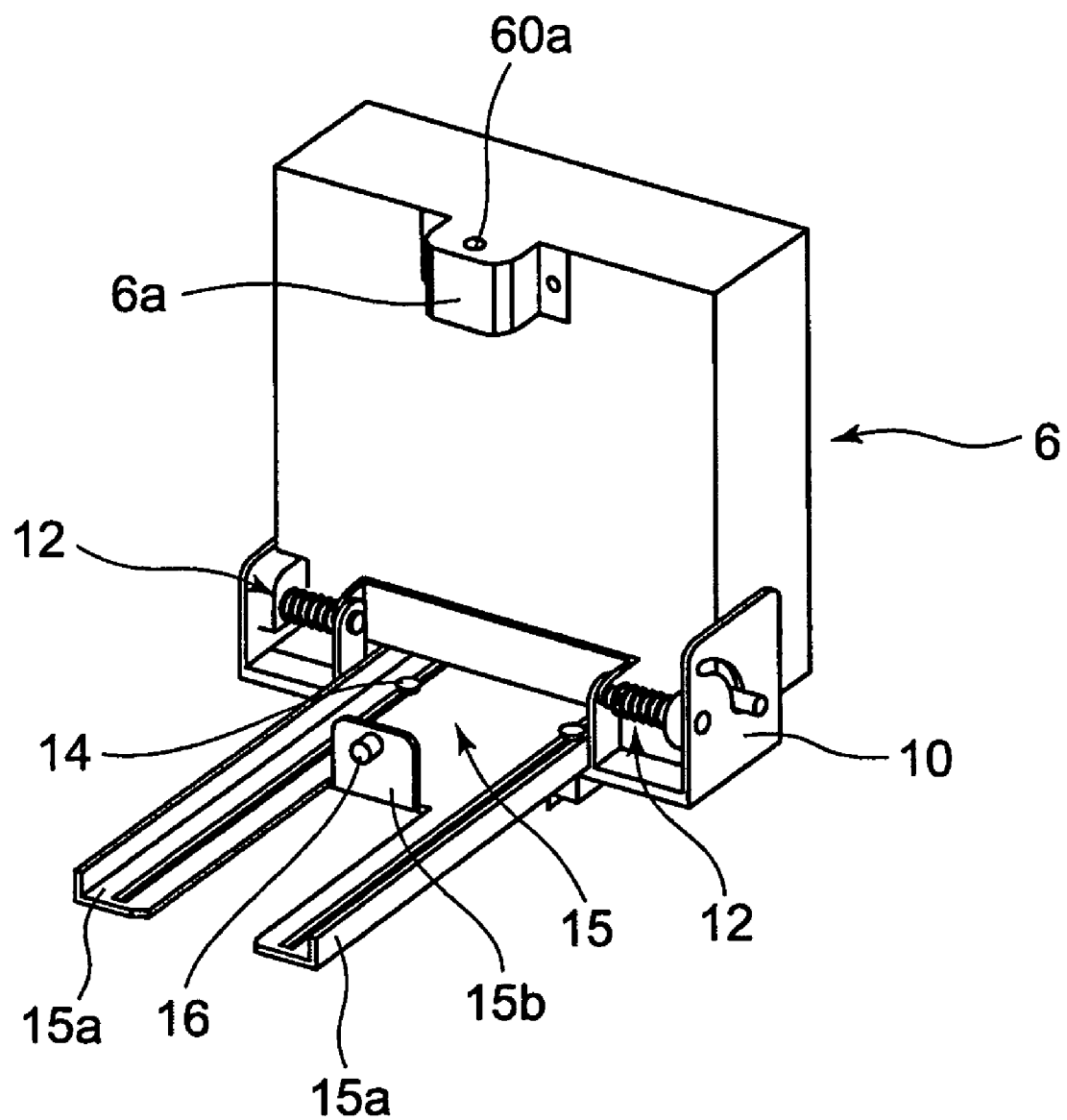
FIG. 13 a diagram that illustrates a state in which the hand section is in the vertically-orientated state after pivoting.

FIG. 13 a diagram that illustrates a state in which the hand section 6 is in the vertically-orientated state after pivoting.

In the state in which the lock pin 16 is removed from the through hole 60a, when the pin 13 in the state of FIG. 10 is depressed, the hand section 6 pivots 90 degrees from the state of FIG. 10 and thereby the vertically-orientated state is realized. At the time, the pin 13 reaches the lowermost part of the curved opening section 13a as illustrated in FIG. 13. The vertically-orientated state of the hand section 6 is maintained while the force for depressing the pin 13 continues.

Here, in the library device 100 of the first embodiment, by using a force produced when the hand section 6, the plate 15 and the hand base 10 in FIG. 8B are horizontally moved by the horizontal-movement motor 9 within the robot base 18, there are produced two kinds of external forces; the external force for pressing the plate 15 in the directions indicated by the arrows Y in FIG. 12A relative to the hand base 10, and the external force for depressing the pin 13 in FIG. 10 in the arrow $x_1$ direction in FIG. 10 along the curved opening section 13a, which have been described above. Thus, in the library device 100 of the first embodiment, there is no need to newly provide a motor to change the posture (orientation) of the hand section 6 (or the housing section 6a) and a control system for the motor and therefore, an increase in cost is avoided.

In the following, how the posture of the hand section 6 is changed by rotational driving of the horizontal-movement motor 9 within the robot base 18 will be described.

FIG. 14A through FIG. 14D are diagrams that illustrate how the posture of the hand section 6 is changed by the rotational driving of the horizontal-movement motor 9 in FIG. 9 within the robot base 18.

FIG. 14A through FIG. 14D illustrate, in stages, how the posture of the hand section 6 changes as the hand base 10 moves, when the robot 4 in FIG. 3 is viewed from the front (left front side in FIG. 8B) of the library device 100. As illustrated in FIG. 9, the groove 19 is provided in the side wall 18a of the robot base 18. In FIG. 14A through FIG. 14D, as for the side wall 18a, a cross section in which the side wall 18a is divided into an upper part and a lower part by the groove 19 is illustrated. Incidentally, in FIG. 14A through FIG. 14D, illustration of an undersurface part of the robot base 18 is omitted.

Further, in FIG. 14A through FIG. 14D, the plate 15 overlapping the side wall 18a of the robot base 18 is illustrated.

Figure 14A:
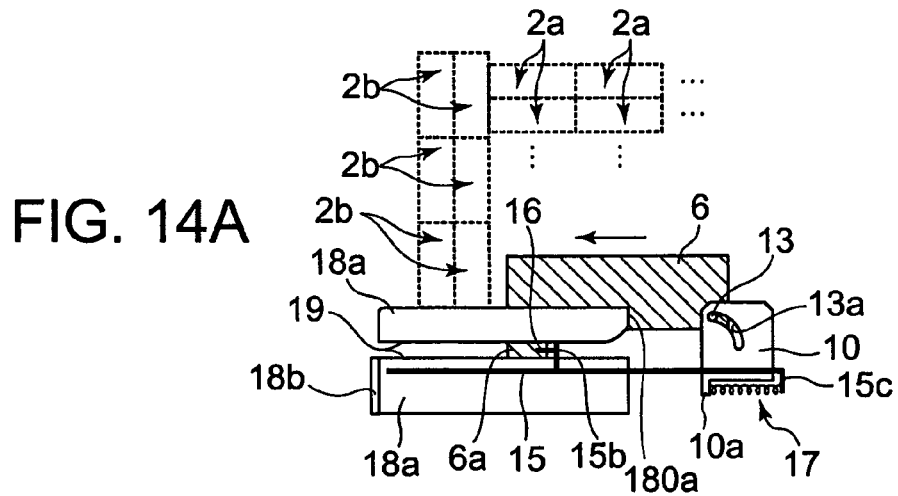
FIG. 14A through FIG. 14D are diagrams that illustrate how the posture of the hand section is changed by the rotational driving of the horizontal-movement motor in FIG. 9 within the robot base.

FIG. 14A illustrates a state in which the hand base 10 in the state of being horizontally oriented and mounted with the plate 15 and the hand section 6 is moved, by a rotation driving force of the horizontal-movement motor 9 in FIG. 9, in a direction indicated by a left-pointing arrow in FIG. 14A. Here, the state of FIG. 14A is a state immediately before when the tip portion of the plate 15 facing in the moving direction contacts a wall 18b (hereinafter referred to as a front wall 18b to be distinguished from the side wall 18a) of the robot base 18 in the moving direction. Here, FIG. 14A illustrates the horizontally-oriented cells 2a and the vertically-oriented cells 2b provided behind the hand base 10, the plate 15 and the hand section 6, and indicated by a dotted line. As illustrated in FIG. 14A, the vertically-oriented cells 2b are present while concentrating behind the side wall 18a.

When the tip of the plate 15 contacts the front wall 18b of the robot base 18 in the moving direction by accompanying the movement of the hand base 10, the plate 15 is prevented from moving further in the leftward direction in FIG. 14A. Then, in a state in which the position of the plate 15 remains fixed, the hand base 10 moves in the leftward direction in FIG. 14A while being mounted with the hand section 6.

Figure 14B:
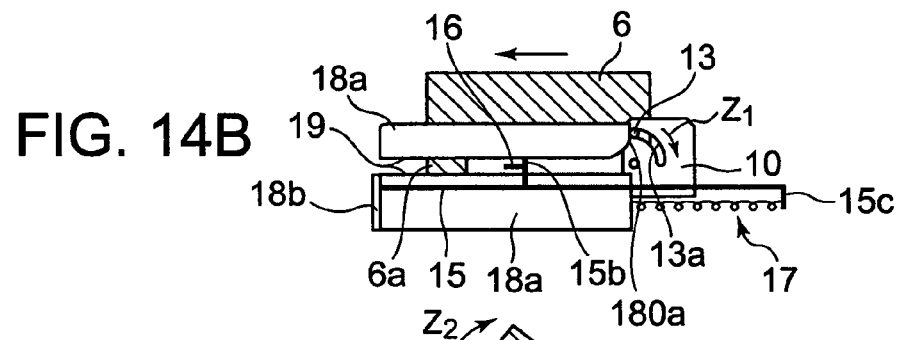

The state at this moment is illustrated in FIG. 14B. As described above with reference to FIG. 12A and FIG. 12B, the pressing springs 17 are provided between the plate 15 and the hand base 10. After the tip of the plate 15 contacts the front wall 18b of the robot base 18, the hand base 10 keeps moving while pulling the pressing springs 17 as illustrated in FIG. 14B. As a result, as illustrated in FIG. 14B, the lock pin 16 of the plate 15 is in the state of being removed from the through hole 60a provided in the convex section 6a of the hand section 6. Further, as the hand base 10 moves, the pin 13 of the hand section 6 contacts an edge 180a of the side wall 18a of the robot base 18. Subsequently, by a force of the hand base 10 trying to keep moving, the pin 13 is depressed in an arrow $Z_1$ direction in FIG. 14B along the curved opening section 13a of the plate 15.

Figure 14C:
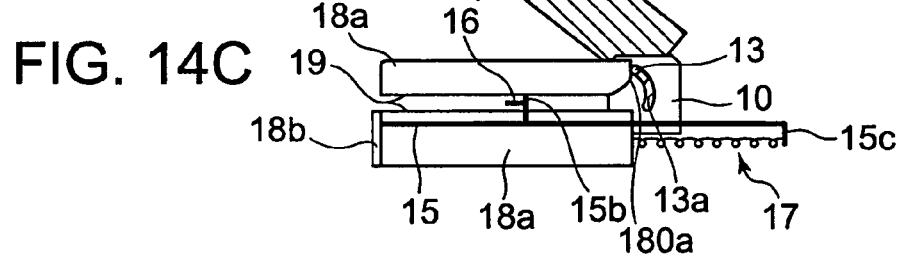

FIG. 14C illustrates a state in which the pin 13 is depressed along the curved opening section 13a of the plate 15. As described above with reference to FIG. 10, due to the depression of the pin 13, the hand section 6 pivots in an arrow $Z_2$ direction in FIG. 14C by resisting a biasing force of the rotation springs 12 (see FIG. 11) not illustrated in FIG. 14C.

Figure 14D:
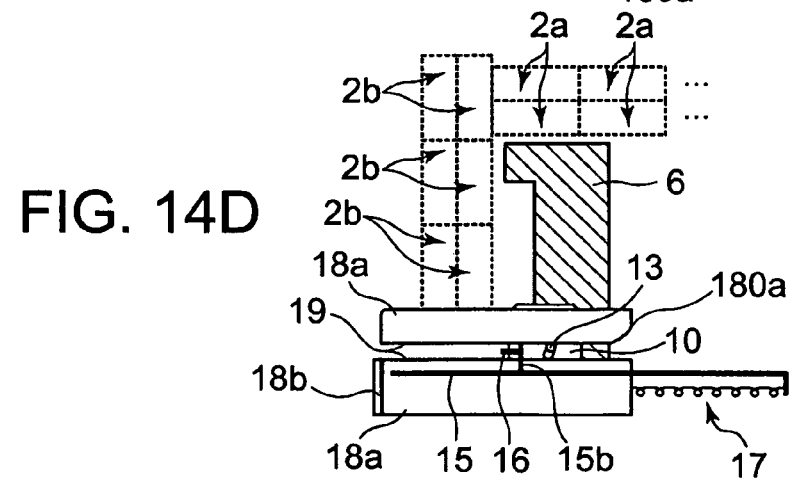

FIG. 14D illustrates a state in which the pin 13 is completely depressed. When the pin 13 is completely depressed, the hand section 6 is in the vertically-oriented posture as illustrated in FIG. 14D. At the time, as illustrated in FIG. 14D, the pin 13 is caught by an edge of the upper part of the groove 19 and thereby the vertically-oriented posture is stably maintained. In this posture, the hand section 6 approaches the vertically-oriented cells 2b, and transfer of the storage medium 1 between the hand section 6 and the vertically-oriented cells 2b is performed.

When the hand base 10 moves in the rightward direction in FIG. 14D after the transfer of the storage medium 1 between the hand section 6 and the vertically-oriented cells 2b is finished, by this movement, the pin 13 is released from the groove 19 of the side wall 18a of the robot base 18 and further released from the edge 180a of the side wall 18a of the robot base 18 as well. Subsequently, the hand section 6 pivots in the direction opposite to the arrow $Z_2$ direction in FIG. 14C by a biasing force of the rotation springs 12 (see FIG. 11) not illustrated here, and returns to the horizontally-oriented posture in FIG. 14A. In this horizontally-oriented posture, the transfer of the storage medium 1 between the hand section 6 and the horizontally-oriented cells 2a and the drive 3 is carried out.

Here, the side wall 18a of the robot base 18 is equivalent to an example of the posture-changing member in the library device having the one aspect described above. Further, the position of the hand section 6 (and the housing section 6a) illustrated in FIG. 14B when the pin 13 of the hand section 6 contacts the edge 180a of the side wall 18a of the robot base 18 is equivalent to an example of the predetermined position in the library device having the one aspect described above. Furthermore, in the library device 100 of the first embodiment, as for the hand section 6, the horizontally-oriented posture is equivalent to an example of the first posture in the library device having the one aspect described above, and the vertically-oriented posture is equivalent to an example of the second posture in the library device having the one aspect described above.

As described above, in the library device 100 of the first embodiment, the hand section 6 (or the housing section 6a) of the robot 4 takes the vertically-oriented posture when contacting the side wall 18a of the robot base 18 and takes the horizontally-oriented posture when not contacting the side wall 18a. Therefore, the hand section 6 (or the housing section 6a) may change the posture according to the orientation of the drive 3 or the cell 2a or 2b that is a receiver or a sender of the storage medium 1 in the transfer. For this reason, in the library device 100 of the first embodiment, even when the cells 2a that contain the storage media 1 in the horizontal position and the cells 2b that contain the storage media 1 in the vertical position are mixed, the transfer of the storage medium 1 between the cells 2a or 2b and the drives 3 is carried out without a hitch. Moreover, the change in the posture of the hand section 6 (or the housing section 6a) is determined based on whether or not the pin 13 of the hand section 6 moves to a position to contact the side wall 18a of the robot base 18 and thus, there is no need to separately provide a drive system for changing the posture and a control system for the drive system. For this reason, in the library device 100 of the first embodiment, an increase in cost to be caused by providing the drive system and the control system is avoided.

Next, the second embodiment will be described.

Figure 15:
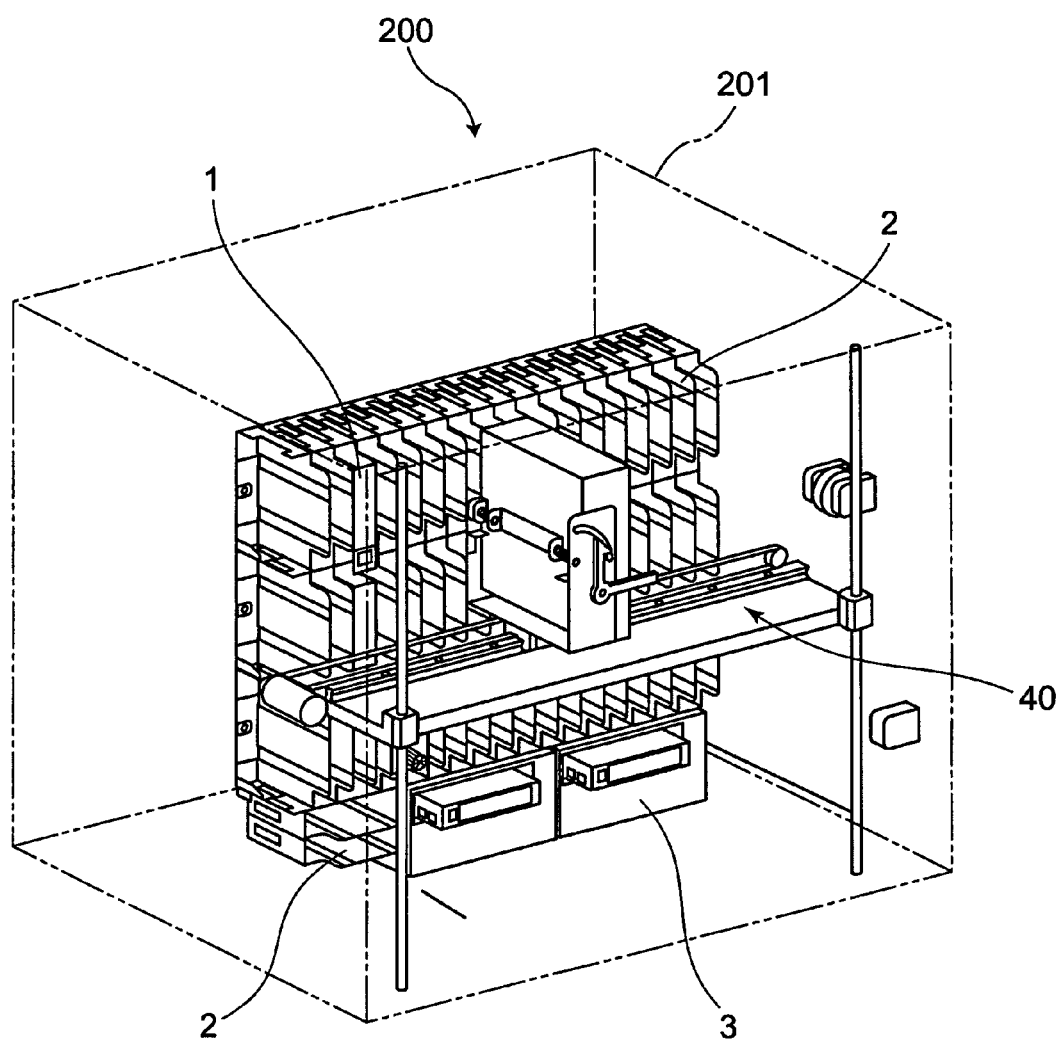
FIG. 15 is an external perspective view of a library device of a second embodiment.
Figure 16:
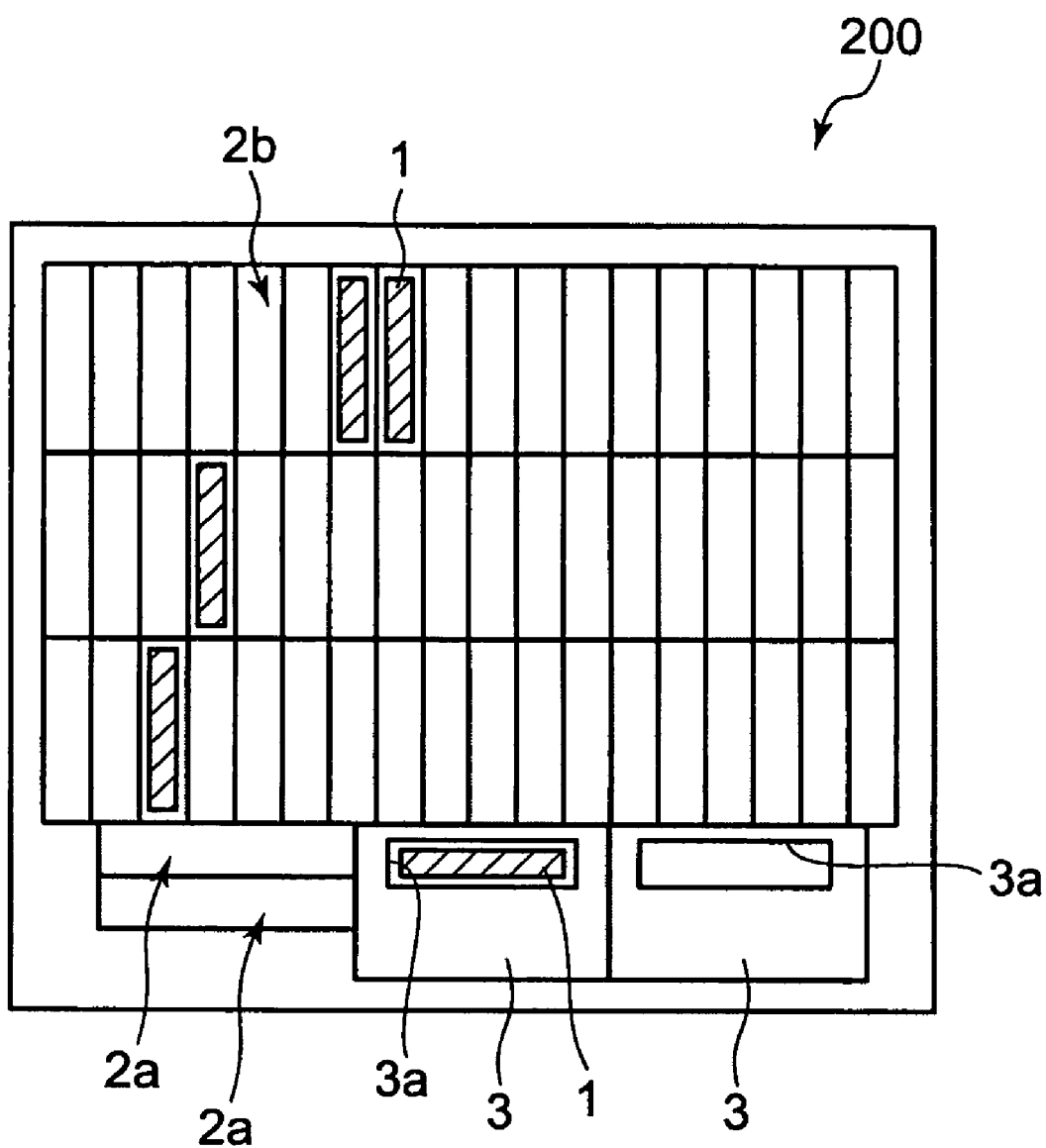
FIG. 16 is a diagram that illustrates an arrangement of cells and drives in the library device in FIG. 15.

FIG. 15 is an external perspective view of a library device 200 of the second embodiment, and FIG. 16 is a diagram that illustrates an arrangement of cells and drives in the library device 200 in FIG. 15.

In FIG. 15 and FIG. 16, the same elements as those in FIG. 3 and FIG. 4 are provided with the same reference characters, and overlapping description will be omitted.

In the library device 200 of the second embodiment, there are provided, inside a frame 201, horizontally-oriented cells 2a that contain storage media horizontally placed and vertically-orientated cells 2b that contain storage media vertically placed. Further, the library device 200 includes two drives 3 that are horizontally-oriented drives in each of which the storage medium in a horizontally-placed state is to be housed. Here, the plural cells 2a and 2b and the two drives 3 are fixed to the frame 201. Further, the library device 200 includes a robot 40 that transfers the storage medium between the cells 2a or 2b and the drives 3.

As illustrated in FIG. 16, the library device 200 of the second embodiment is a library device in which the number of the vertically-oriented cells 2b is larger than the number of the horizontally-oriented cells 2a, and a greater density in the arrangement of the cells is achieved by arranging the horizontally-oriented cells 2a in available space that is formed when the vertically-oriented cells 2b are arranged as many as possible within the frame 201. Here, the horizontally-oriented cells 2a and the horizontally-oriented drives 3 are arranged to be concentrated on a lower part (the lower side in FIG. 16) of the library device 200.

Next, the robot 40 illustrated in FIG. 15 will be described.

Figure 17:
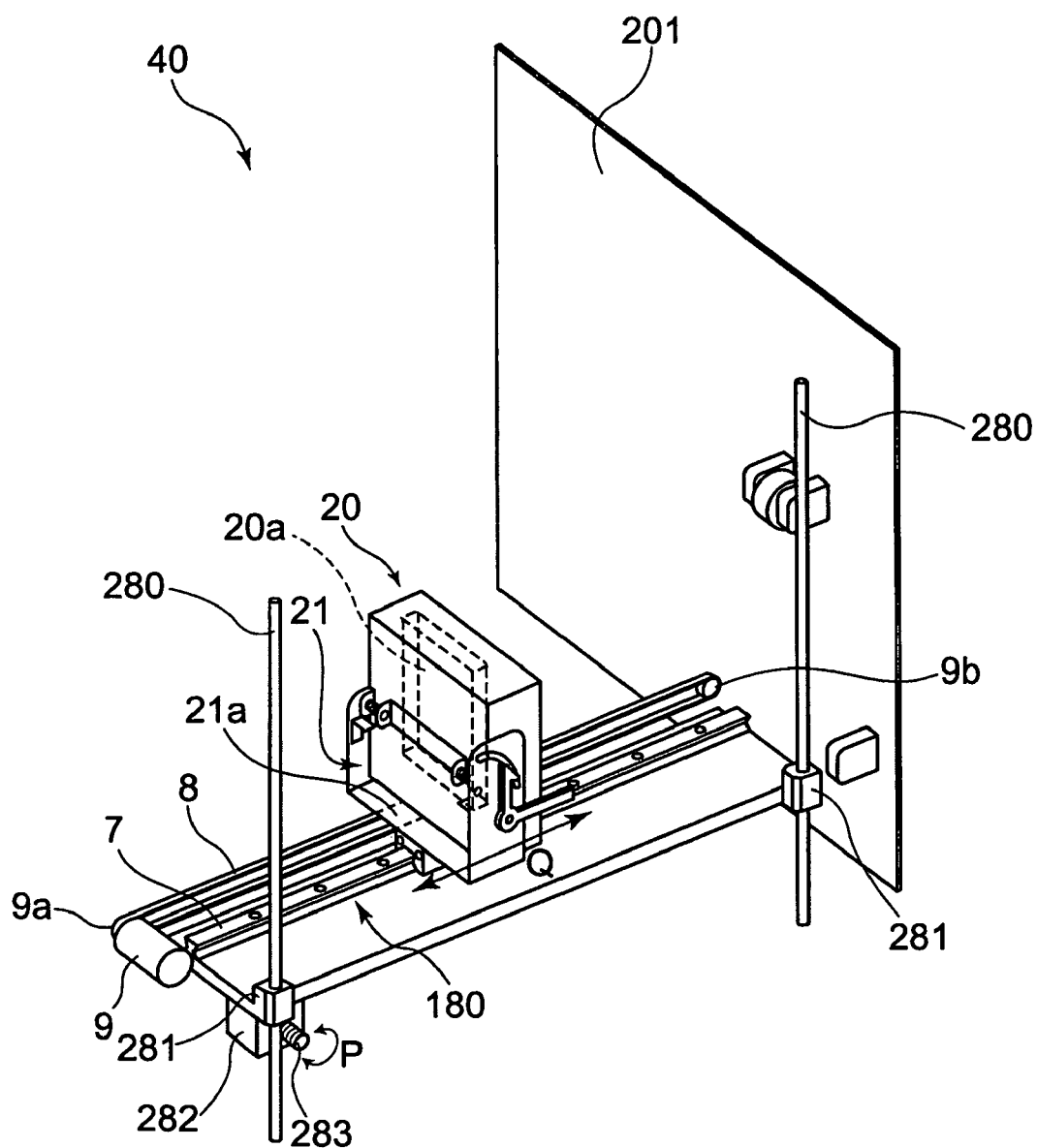
FIG. 17 is a diagram that illustrates the robot illustrated in FIG. 15.

FIG. 17 is a diagram that illustrates the robot 40 illustrated in FIG. 15.

FIG. 17 is an overview diagram of the robot 40 when the robot 40 is viewed from a right front side to a left rear side in FIG. 15.

As illustrated in FIG. 17, the robot 40 includes a hand section 20, a hand base 21 and a robot base 180.

The hand section 20 serves to: transfer the storage media 1 between the cells 2a, 2b and the drives 3; retrieve the storage medium 1 from the cells 2a, 2b as well as put the storage medium 1 in the cells 2a, 2b; and retrieve the storage medium 1 from the drive 3 as well as put the storage medium 1 in the drive 3. As illustrated in FIG. 17, the hand section 20 has a housing section 20a that houses the storage medium 1. This housing section 20a is open outside the hand section 20, and an opening of this housing section 20a is directed toward where the cells 2a and 2b and the drives 3 illustrated in FIG. 16 are arranged (in a left backward direction in FIG. 15). As will be describe later, this hand section 20 is supported in a state of being rotatable, relative to the hand base 21, within a plane spreading in two directions, namely, a vertical direction in FIG. 17 and a direction linking a left front side and a right rear side. As illustrated in FIG. 17, on the robot base 180, a guide rail 7 is provided, and the hand base 21 travels in a direction indicated by a double-headed arrow Q in FIG. 17 on this guide rail 7, together with the hand section 20. As a drive system to realize such traveling of the hand base 21, the robot 40 includes a horizontal-movement motor 9 and a belt 8. The belt 8 is held by a rotating section 9a and a roller 9b of the horizontal-movement motor 9, and a part of the belt 8 is fixed to a connection section 21a at a lower part of the hand base 21. When the rotating section 9a of the horizontal-movement motor 9 rotates, the belt 8 moves by following the rotation of the rotating section 9 while rotating the roller 9b, and thereby the hand base 21 travels on the guide rail 7 together with the hand section 20 in the direction indicated by the double-headed arrow Q.

Here, the robot base 180 may move in the vertical direction in FIG. 17. A moving system in this vertical direction will be described below. The robot base 180 has two grip sections 281, and these grip sections 281 are connected to two columns 280 while being in a state of vertically movable. To an undersurface of the robot base 18, a vertical-movement motor 282 is fixed, and a rotating section 283 of the vertical-movement motor 282 contacts the column 280 on the left hand side in FIG. 17. Due to such a structure, when the rotating section 283 of the vertical-movement motor 282 rotates in a direction indicated by a double-headed arrow P in FIG. 17, the robot base 180 moves in the vertical direction in FIG. 17. In this movement in the vertical direction, the hand section 20 and the hand base 21 move in the vertical direction in FIG. 17 along the columns 280 together with the robot base 180.

In the robot 40, the robot base 180 moves in the vertical direction in FIG. 17 and the hand base 21 moves on the robot base 180. Therefore, the hand section may approach the desired cell 2a, 2b or drive 3, and in this approached state, the storage medium 1 is transferred between the desired cell 2a, 2b or drive 3 and the hand section 20. Here, as will be described later, the hand section 20 may rotate within a plane spreading in the direction in which the guide rail 7 extends and the vertical direction in FIG. 17, and at the time of the above-mentioned transfer, the hand section 20 takes a horizontally-oriented posture to house the storage medium 1 in a horizontally-placed state or a vertically-oriented posture to house the storage medium 1 in a vertically-placed state, depending on whether the orientation of the desired cell 2a, 2b or drive 3 is horizontal or vertical. FIG. 17 illustrates a state in which the hand section 20 is in the horizontally-oriented posture of these two postures.

Here, the combination of the robot 40 and the two columns 280 is equivalent to an example of the medium-transferring unit in the library device having the one aspect described above. Further, the hand base 21 is equivalent to an example of the support member in the library device having the one aspect described above, and the combination of the two columns 280, the vertical-movement motor 282, the belt 8, the roller 9b and the horizontal-movement motor 9 is equivalent to an example of the movement-controlling system in the library device having the one aspect described above. Furthermore, the hand section 20 is equivalent to an example of the medium-transferring unit in the library device having the one aspect described above, and the housing section 20a is equivalent to an example of the housing section in the library device having the one aspect described above.

Next, the hand section 20 and the hand base 21 illustrated in FIG. 17 will be described.

Figure 18:
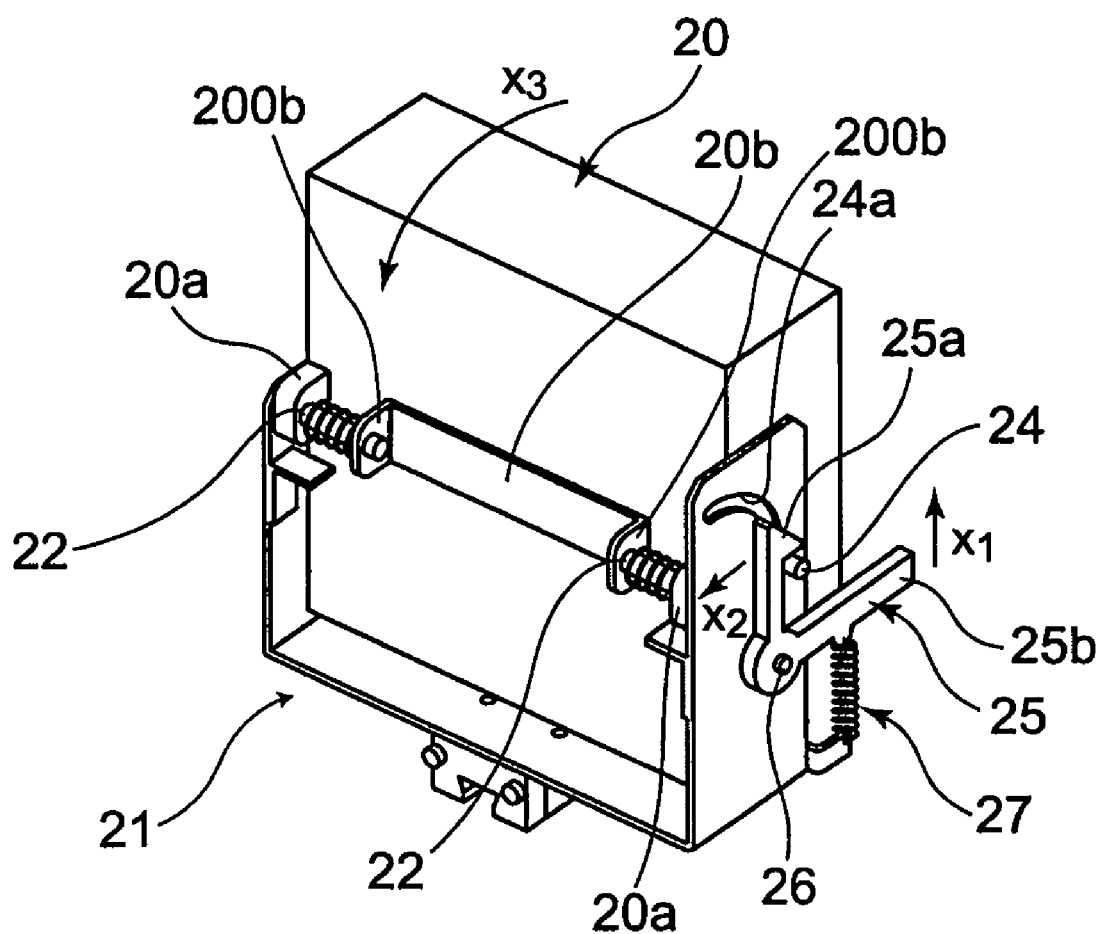
FIG. 18 is a diagram that illustrates the hand section and the hand base illustrated on an upper part of FIG. 17.
Figure 19:
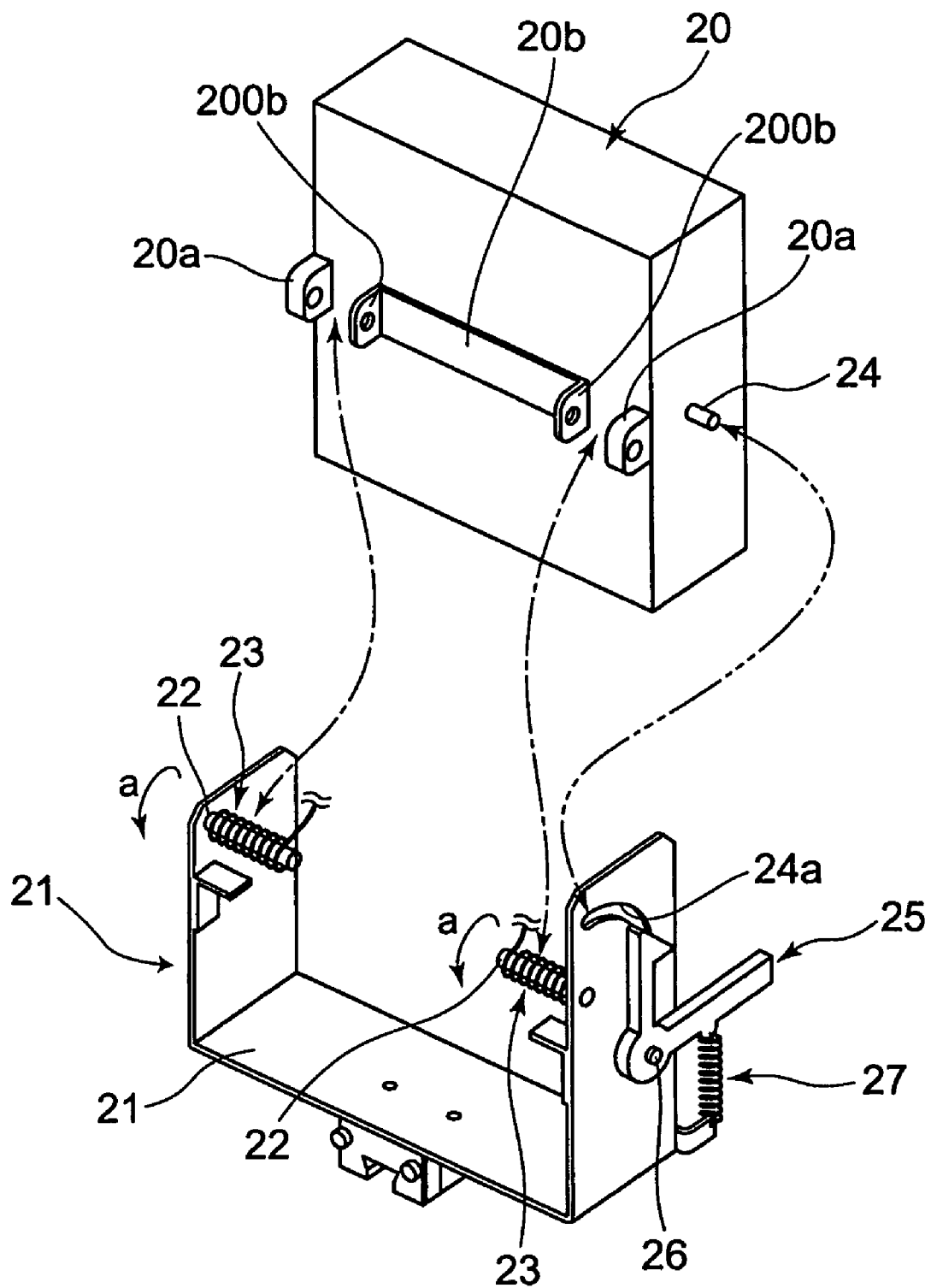
FIG. 19 is an exploded view that illustrates the hand section and the hand base separated from each other.

FIG. 18 is a diagram that illustrates the hand section 20 and the hand base 21 illustrated on an upper part of FIG. 17, and FIG. 19 is an exploded view that illustrates the hand section 20 and the hand base 21 separated from each other.

As illustrated in FIG. 18, the hand base 21 has two opposed tabular parts between which the hand section 20 is interposed, and a right tabular part of these two tabular parts has a curved opening section 24a in which a curved opening is formed. As indicated by a double-headed arrow formed by a triple-dashed line in FIG. 19, a pin 24 of the hand section 20 is inserted into the opening of this curved opening section 24a from left to right. Here, as illustrated in FIG. 18, when the hand section 20 is in a state of being vertically oriented relative to the hand base 21, the pin 24 is located at a lower part of the curved opening section 13a as illustrated in FIG. 18. Further, the hand base 21 has a locking arm 25 that pivots about a rotation shaft 26. The locking arm 25 is shaped like a letter L, the rotation shaft 26 is located at a bent part of the letter L, and these two arms extend from this bent part. Of these two arms, one extending upward in FIG. 18 and FIG. 19 has a tip 25a shaped like a hook. This tip 25a shaped like a hook will be hereinafter referred to as the hook-shaped tip 25a. When the hand section 20 is in a vertically-oriented state illustrated in FIG. 18 and FIG. 19, the hook-shaped tip 25a is held by the pin 24 protruding rightward from the curved opening section 24a as illustrated in FIG. 18. Here, a pulling spring 27 is connected to one extending laterally in FIG. 18 and FIG. 19 of the two locking arms 25, and due to the elasticity of this pulling spring 27, the arm extending laterally is pulled downward. Thus, torque to cause the locking arm 25 to pivot about the rotation shaft 26 clockwise in FIG. 18 and FIG. 19 is generated, and the state in which the hook-shaped tip 25a is held by the pin 24 is maintained.

The hand section 20 includes first connection sections 20a and a second connection section 20b. As illustrated in FIG. 18 and FIG. 19, the first connection sections 20a are respectively provided both sides of the hand section 20, and the second connection section 20b is disposed between the first connection sections 20a. A through hole is provided in each of these two first connection sections 20a. On the other hand, the second connection section 20b has two projecting sections 200b each having a through hole. In the second connection section 20b, the through hole of each of the two projecting sections 200b is located at a position facing the through hole of corresponding one of the two first connection sections 20a. As illustrated in FIG. 18, each shaft 22 that is a part of the hand base 21 is inserted into the through hole of the first connection section 20a and the through hole of the projecting section 200b of the second connection section 20b, and thereby the hand section 20 is rotatably connected to the hand base 21 by using each of the shafts 22 as a rotation shaft. Here, a rotation spring 23 is wound around each of the shafts 22. One end of each of the rotation springs 23 is fixed to the shaft 22, and the other end is connected to the hand section 20 as indicated by each double-headed arrow formed by alternate long and short dashed lines in FIG. 19. By these rotation springs 23, the hand section 20 is biased to pivot about each of the shafts 22 serving as the rotation shaft in an arrow a direction in FIG. 19. Therefore, when the hand section 20 is in the vertically-oriented state as illustrated in FIG. 18 and FIG. 19, a force to orient the hand section 20 horizontally acts, but the hook-shaped tip 25a of the locking arm 25 is held by the pin 24 and thus, the vertically-orientated state is maintained. This rotation spring 12 is equivalent to an example of the biasing member in the library device having the one aspect described above.

Here, when an external force is applied to a tip 25b of the locking arm 25 extending laterally in FIG. 18 in an $x_1$ direction in FIG. 18, due to a torque with this external force, the hook-shaped tip 25a moves in an $x_2$ direction in FIG. 18 and results in a state of being released from the pin 24. In this state, due to the biasing force of the rotation spring 23, the pin 24 moves upward within the curved opening section 24a and concurrently the entire hand section 20 pivots in an $x_3$ direction in FIG. 18. As a result, the hand section 20 becomes horizontally oriented.

Figure 20:
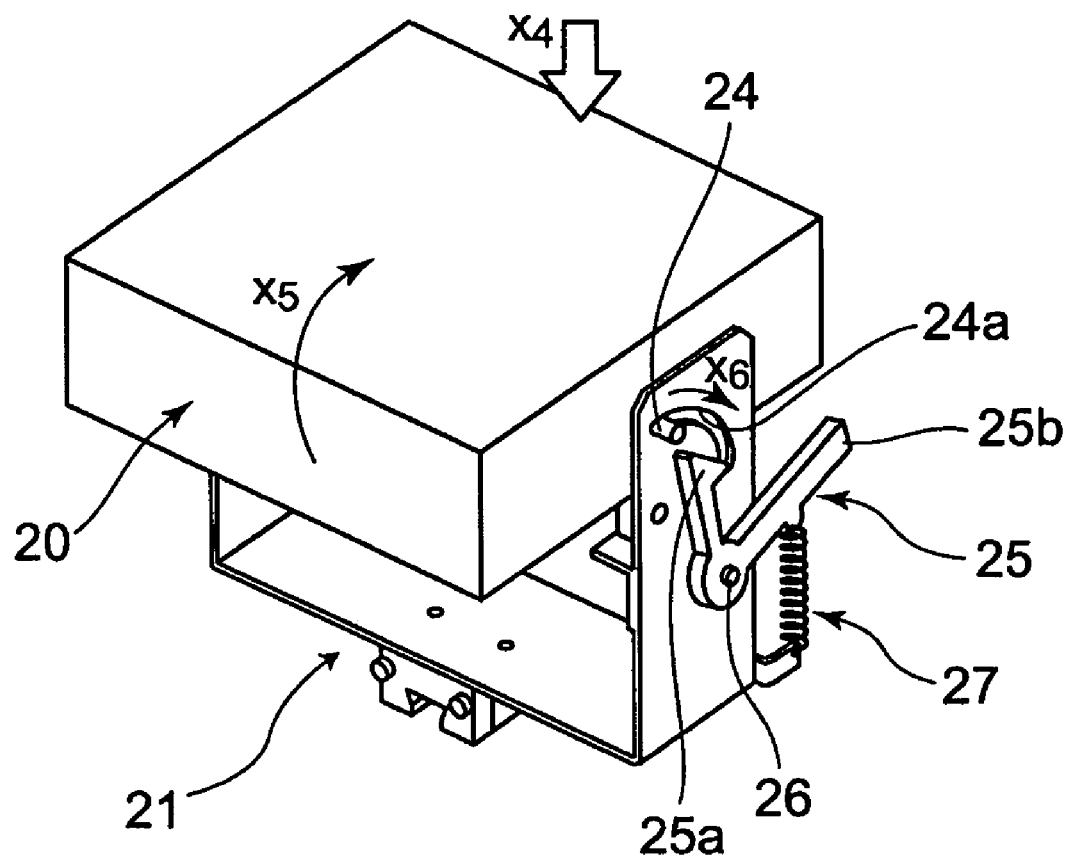
FIG. 20 is a diagram that illustrates the hand section in the horizontally-oriented state.

FIG. 20 is a diagram that illustrates the hand section 20 in the horizontally-oriented state.

When the hand section 20 is in the horizontally-orientated posture completely, the pin 24 reaches the uppermost part of the curved opening section 24a as illustrated in FIG. 20. Here, in the state of FIG. 20, when an external force is newly applied to an edge on the rear side of the hand section 20 in an $x_4$ direction indicated by a thick arrow, the hand section 20 pivots in an $x_5$ direction in FIG. 20 while moving the pin 24 in an $x_6$ direction in FIG. 20 within the curved opening section 24a due to this newly applied external force.

Figure 21:
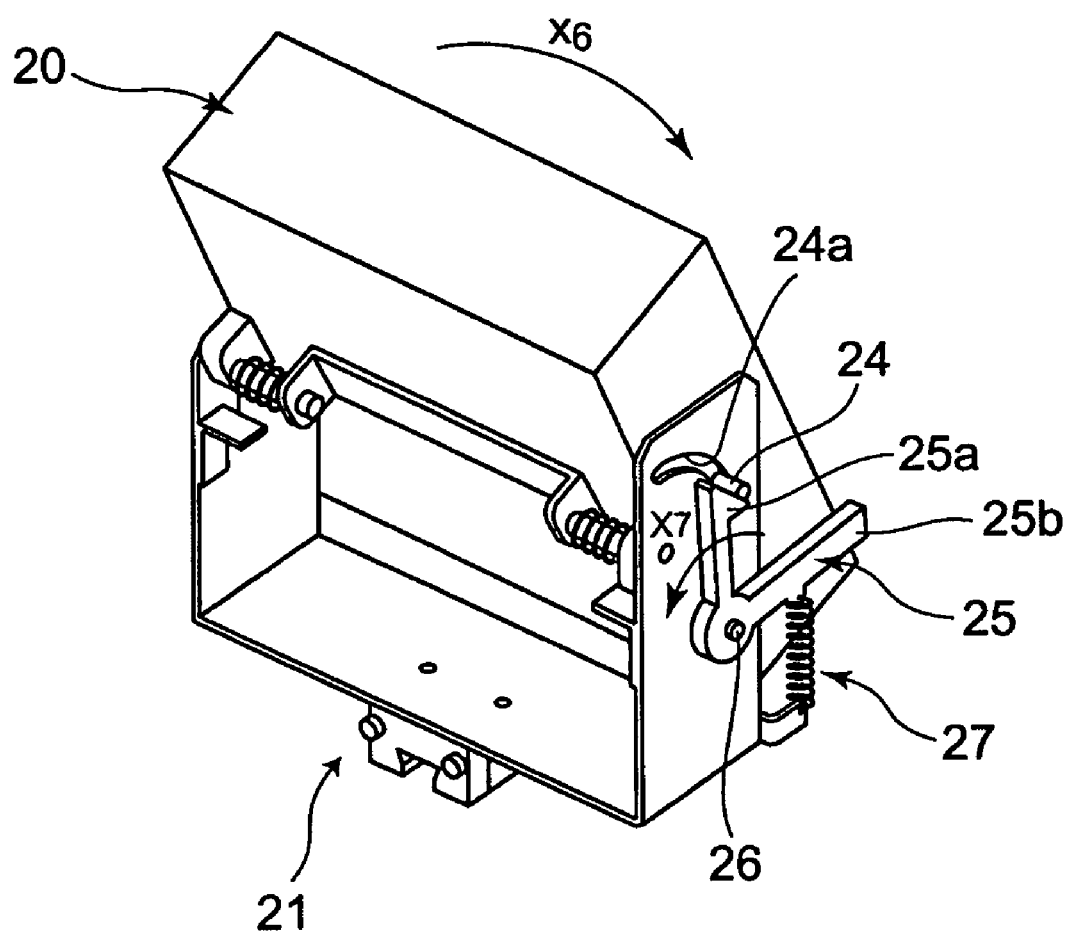
FIG. 21 is a diagram that illustrates a state in which the hand section is pivoting from the horizontally-oriented state illustrated in FIG. 20 to the vertically-oriented state illustrated in FIG. 18.

FIG. 21 is a diagram that illustrates a state in which the hand section 20 is pivoting from the horizontally-oriented state illustrated in FIG. 20 to the vertically-oriented state illustrated in FIG. 18.

When the hand section 20 pivots from the horizontally-oriented state illustrated in FIG. 20 to the vertically-oriented state illustrated in FIG. 18, the pin 24 moves downward within the curved opening section 24a and contacts the hook-shaped tip 25a of the locking arm 25 during such a movement. The hook-shaped tip 25a once pivots in an $x_7$ direction in FIG. 21 by a force of the pin 24 produced at the time of the contact, and by the time the pin 24 reaches the lowermost part of the curved opening section 13a, the hook-shaped tip 25a then pivots in the direction opposite to the $x_7$ direction due to the elasticity of the pulling spring 27. Such pivoting in the direction opposite to the $x_7$ direction causes the hook-shaped tip 25a to engage with the pin 24 and return to the state in FIG. 18.

Here, in the library device 200 of the second embodiment, by using the force of the hand section 20 and the hand base 21 in FIG. 17 moved horizontally by the vertical-movement motor 282, there are generated the above-described external force applied to the tip 25b of the locking arm 25 extending laterally in FIG. 18 and the above-described external force applied to the edge on the rear side of the hand section 20 in FIG. 20. Therefore, in the library device 200 of the second embodiment, there is no need to provide an additional motor for changing the posture (orientation) of the hand section 20 (or the housing section 20a) and a control system for the motor and thus, an increase in cost is avoided.

In the following, how the hand section 20 changes the posture by rotational driving of the vertical-movement motor 282 will be described.

First, how the hand section 20 shifts from the vertically-oriented state to the horizontally-oriented state will be described.

Figure 22:
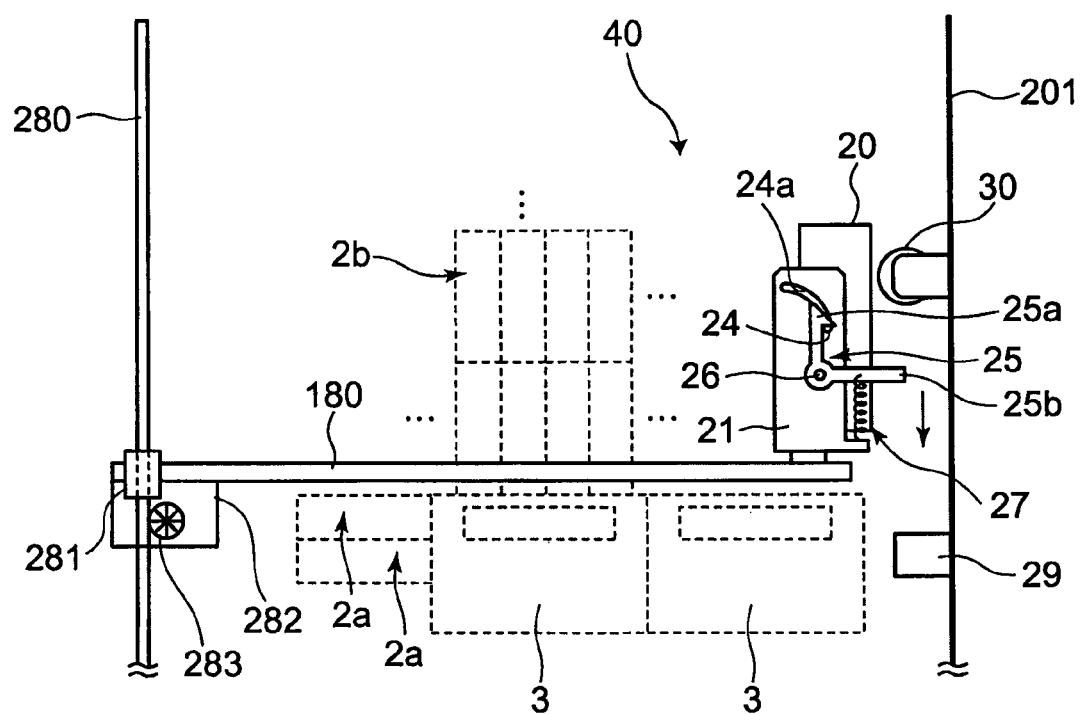
FIG. 22 is a diagram that illustrates how the hand section shifts from the vertically-oriented state to the horizontally-oriented state.
Figure 23:
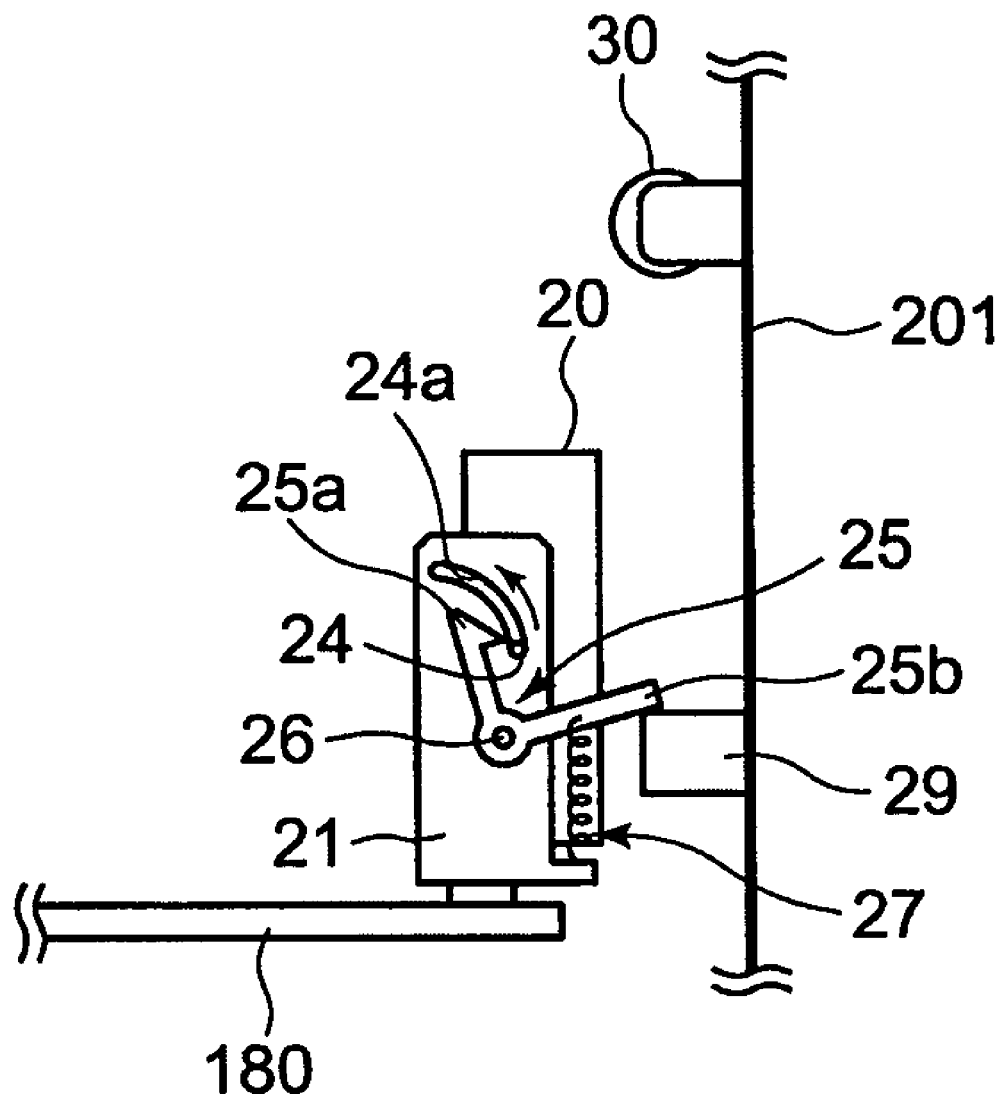
FIG. 23 is a diagram that illustrates how the hand section shifts from the vertically-oriented state to the horizontally-oriented state.
Figure 24:
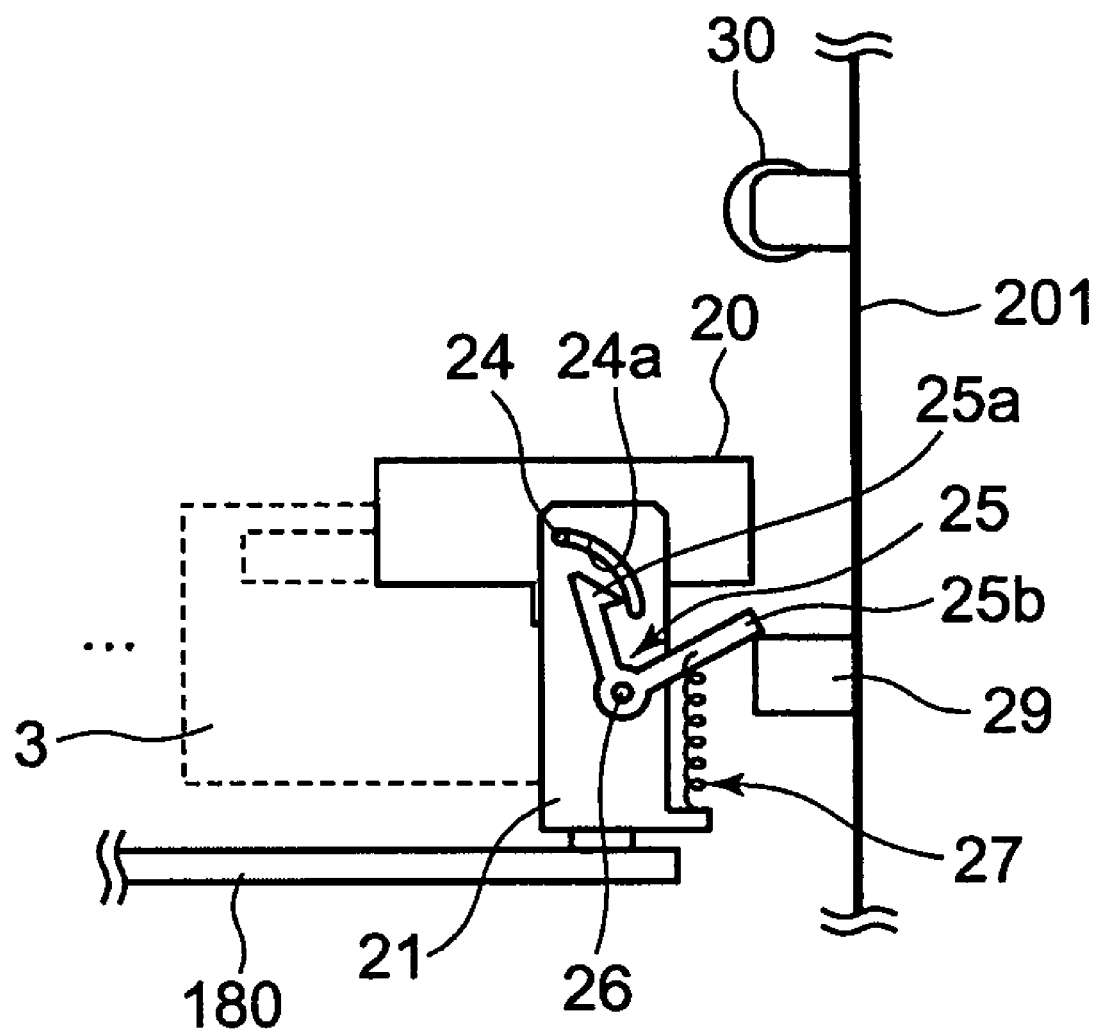
FIG. 24 is a diagram that illustrates how the hand section shifts from the vertically-oriented state to the horizontally-oriented state.

FIG. 22 through FIG. 24 are diagrams that illustrate how the hand section 20 shifts from the vertically-oriented state to the horizontally-oriented state.

FIG. 22 is a diagram in which the robot 40 in FIG. 15 is viewed from the front (right front side in FIG. 15) of the library device 200. As mentioned earlier, the robot base 180 of the robot 40 moves along the columns 280 by the rotational driving of the vertical-movement motor 282, and thereby the hand section 20 and the hand base 21 move vertically. FIG. 22 illustrates a state in which after the transfer of the storage medium 1 between the hand section 20 in the vertically-oriented position and the vertically-oriented cell 2b (not illustrated in FIG. 22, see FIG. 16), the hand section 20 moves downward as indicated by an arrow to perform transfer of the storage medium 1 between the hand section 20 and the horizontally-oriented cell 2a or the drive 3. As illustrated in FIG. 22, a guide roller 30 and a block 29 are provided on an upper part of a side wall of the frame 201. Here, the block 29 is provided near the horizontally-oriented cells 2a and the drives 3 in terms of the vertical direction, and the hand section 20 moving downward soon contacts the block 29.

FIG. 23 is a diagram that illustrates a state in which the hand section 20 in the vertically-oriented position contacts the block 29.

While the hand section 20 in the vertically-oriented position moves downward, the tip 25b of the locking arm 25 of the hand section 20 contacts the block 29. Due to this contact, counterclockwise torque around the rotation shaft 26 is applied to the locking arm 25, and this torque releases the engagement between the pin 24 of the hand section 20 and the hook-shaped tip 25a of the locking arm 25. In this state, by the biasing force of the rotation spring 23, the pin 24 moves within the curved opening section 24a in a direction indicated by an arrow in FIG. 23 and concurrently the entire hand section 20 pivots counterclockwise.

FIG. 24 is a diagram that illustrates a state in which the hand section 20 contacting the block 29 becomes horizontally oriented after pivoting.

When the hook-shaped tip 25a of the locking arm 25 is released from the pin 24, the hand section 20 pivots and becomes horizontally oriented as illustrated in FIG. 24. The height in the vertical direction of the hand section 20 at this moment is approximately the same as the height of the drive 3 (and the horizontally-oriented cells 2a not illustrated in FIG. 24). Because the hand base 21 moves on the robot base 180, the hand section 20 in the horizontally-oriented position may approach the desired horizontally-oriented cell 2a (not illustrated in FIG. 24, see FIG. 22) or drive 3, and in this approached state, the storage medium 1 is transferred between the desired horizontally-oriented cell 2a or drive 3 and the hand section 20. Incidentally, before this transfer, the hand base 21 moves in the vertical direction in FIG. 24 by the vertical-movement motor 282 in FIG. 22 as necessary, and thereby the height of the hand base 21 is adjusted to meet the height of the desired horizontally-oriented cell 2a (not illustrated in FIG. 24, see FIG. 22) or drive 3.

Next, how the hand section 20 shifts from the horizontally-oriented state to the vertically-oriented state will be described.

Figure 25:
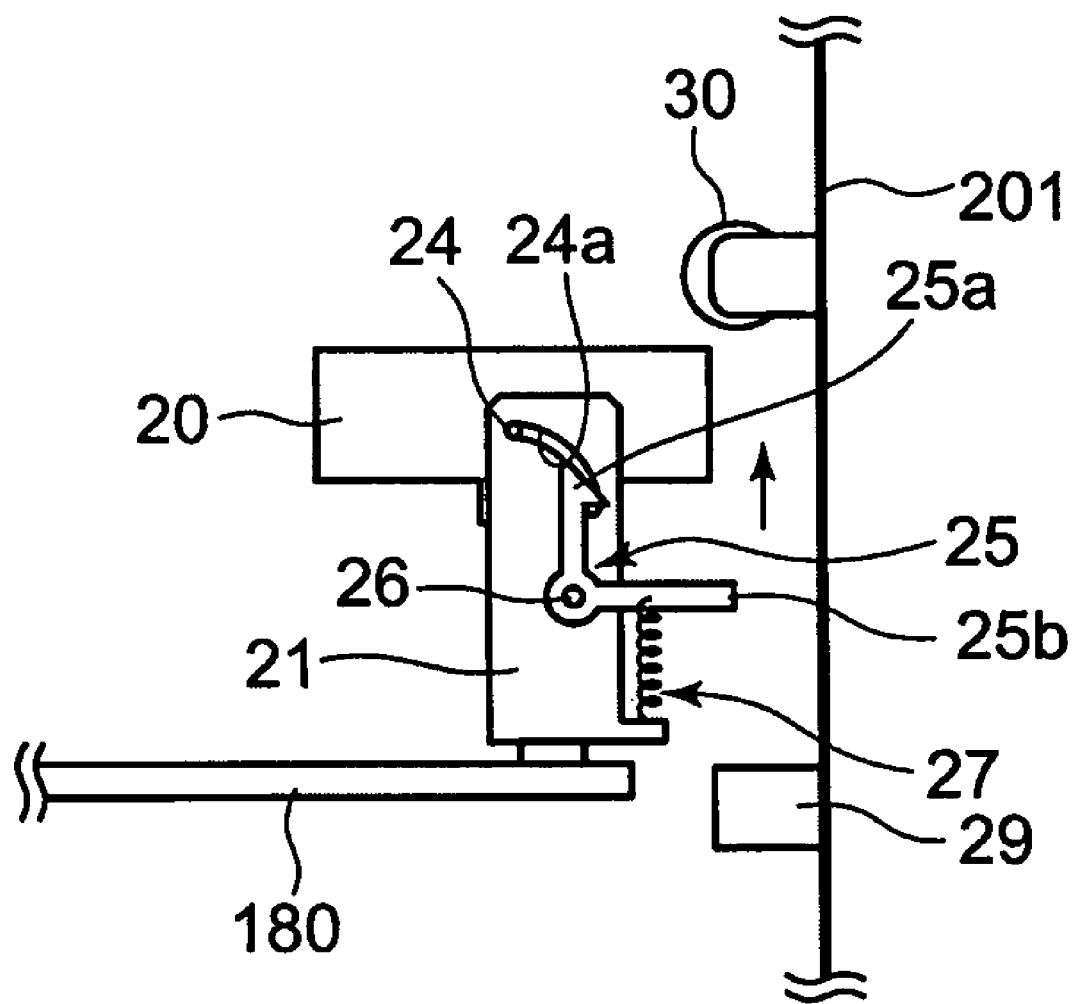
FIG. 25 is a diagram that illustrates how the hand section shifts from the horizontally-oriented state to the vertically-oriented state.
Figure 26:
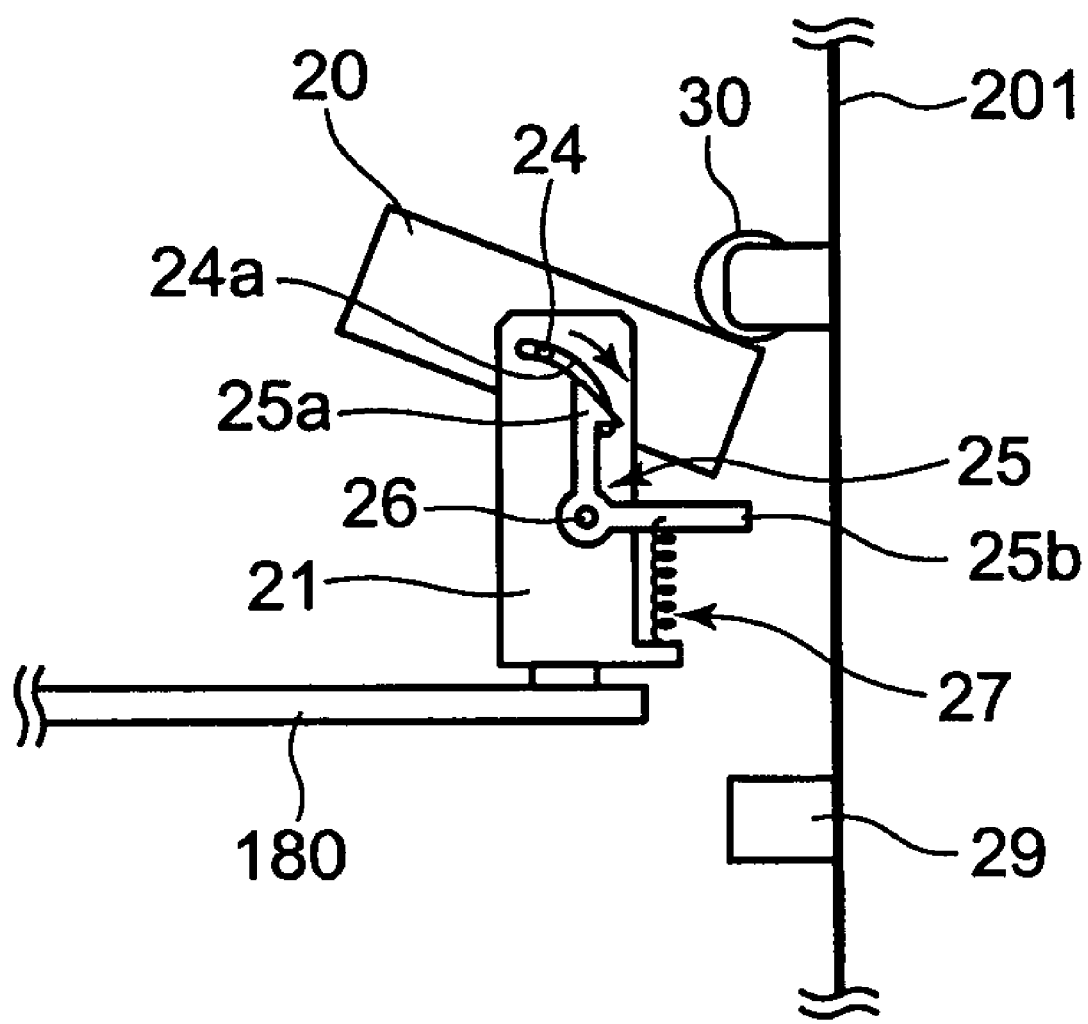
FIG. 26 is a diagram that illustrates how the hand section shifts from the horizontally-oriented state to the vertically-oriented state.
Figure 27:
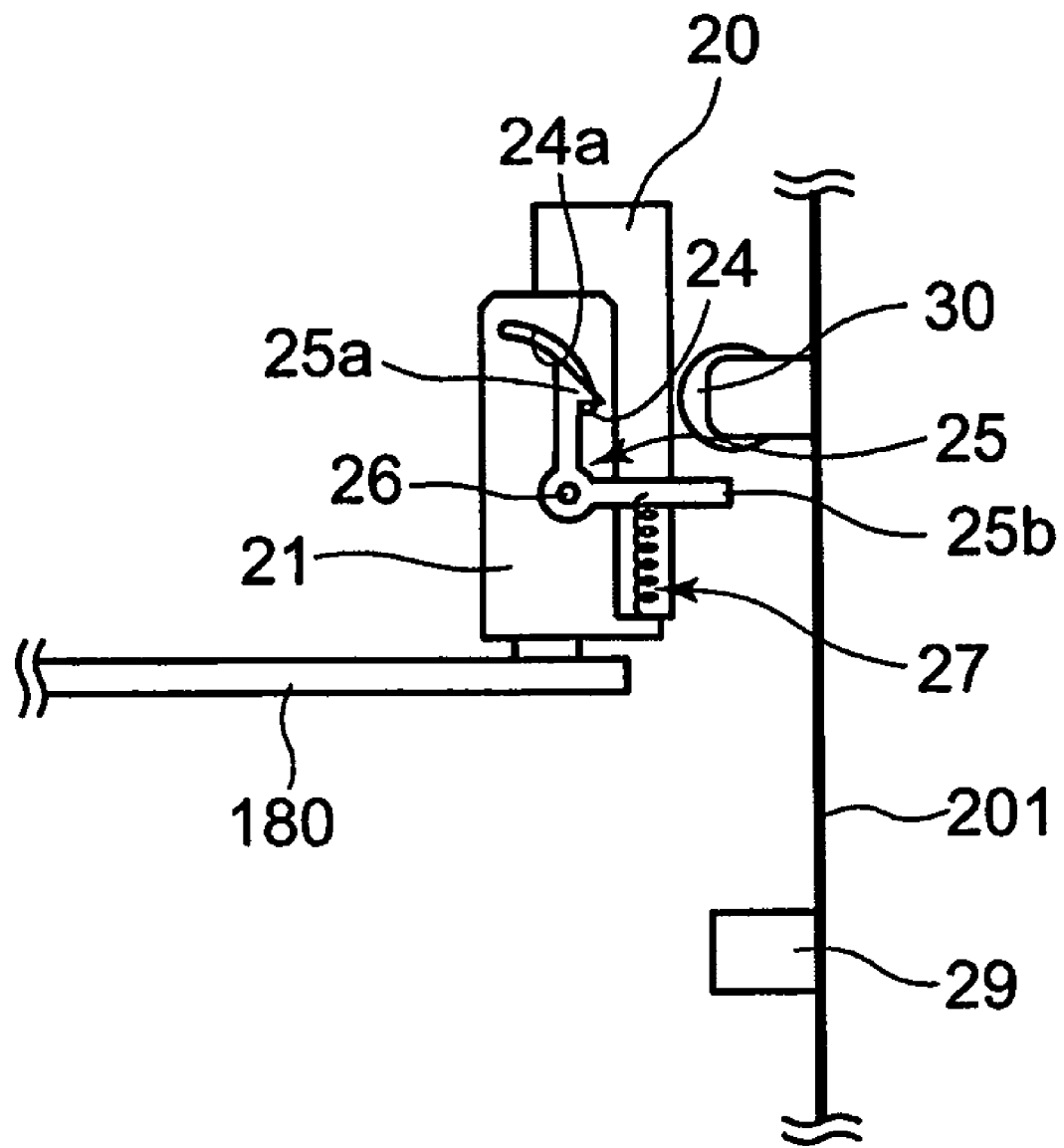
FIG. 27 is a diagram that illustrates how the hand section shifts from the horizontally-oriented state to the vertically-oriented state.

FIG. 25 through FIG. 27 are diagrams that illustrate how the hand section 20 shifts from the horizontally-oriented state to the vertically-oriented state.

FIG. 25 illustrates a state in which after the transfer of the storage medium 1 between the hand section 20 horizontally oriented and the horizontally-oriented cell 2a or drive 3, the hand section 20 moves upward as indicated by an arrow to perform transfer of the storage medium 1 between the hand section 20 and the vertically-oriented cells 2b. The hand section 20 horizontally oriented and moving upward soon contacts the guide roller 30.

FIG. 26 is a diagram that illustrates a state in which the hand section 20 in the horizontally-oriented position contacts the guide roller 30.

While the hand section 20 in the horizontally-oriented position moves upward, an edge of the hand section 20 contacts the guide roller 30 as illustrated in FIG. 26. Due to this contact, torque for causing the hand section 20 to pivot clockwise is applied to the hand section 20, and the hand section 20 pivots clockwise while moving the pin 24 within the curved opening section 24a in a direction indicated by an arrow in FIG. 26. At the time of this pivoting of the hand section 20, the pin 24 moving downward within the curved opening section 24a contacts the hook-shaped tip 25a of the locking arm 25 during this movement, and as described above with reference to FIG. 21, the state in which the hook-shaped tip 25a is engaged with the pin 24 is realized again.

FIG. 27 a diagram that illustrates a state in which the hand section 20 contacting the guide roller 30 becomes vertically oriented after pivoting.

When the hook-shaped tip 25a of the locking arm 25 is held by the pin 24, the vertically-oriented posture of the hand section 20 is stabilized as illustrated in FIG. 27. Because the hand base 21 moves on the robot base 180, the hand section 20 vertically oriented approaches the desired vertically-oriented cell 2b (not illustrated in FIG. 27, see FIG. 22), and in this approached state, transfer of the storage medium 1 between the desired vertically-oriented cell 2b and the hand section 20 is performed. Incidentally, before this transfer, the hand base 21 is moved in the vertical direction in FIG. 24 by the vertical-movement motor 282 in FIG. 22 as necessary and by this movement, the height of the hand base 21 is adjusted to meet the height of the desired vertically-oriented cell 2b.

Here, the combination of the guide roller 30 and the locking arm 25 is equivalent to an example of the posture-changing member in the library device having the one aspect described above. Further, the position (see FIG. 25 and see FIG. 26) of the hand section 6 (and the housing section 6a) contacting the guide roller 30 is equivalent to an example of the predetermined position in the library device having the one aspect described above. Furthermore, in the library device 200 of the second embodiment, as for the hand section 6, the horizontally-oriented posture is equivalent to an example of the first posture in the library device having the one aspect described above, and the vertically-oriented posture is equivalent to an example of the second posture in the library device having the one aspect described above.

As described above, in the library device 200 of the second embodiment, the hand section 20 (or the housing section 20a) of the robot 40 takes the vertically-oriented posture when being engaged with the locking arm 25 and takes the horizontally-oriented posture when being disengaged from the locking arm 25 and thus, the hand section 20 changes the posture according to the posture of the drive 3, cell 2*a* or 2*b* that is a receiver or a sender of the storage medium 1 in the transfer. For this reason, in the library device 200 of the second embodiment, even when the cells 2*a* that contain the storage media 1 in the horizontal position and the cells 2*b* that contain the storage media 1 in the vertical position are mixed, the transfer of the storage medium 1 between the cells 2*a* or 2*b* and the drives 3 is performed without a hitch. Further, the change of the posture of the hand section 20 (or the housing section 20*a*) is determined based on whether or not the hand section 20 moves to the positions of the block 29 and the guide roller 30 and thus, there is no need to separately provide a drive system for changing the posture and a control system for the drive system. Therefore, in the library device 200 of the second embodiment, an increase in cost to be caused by providing the drive system and the control system is avoided.

This concludes the description of the first and second embodiments.

In the above-described first and second embodiments, there has been described the library device in which either the horizontally-oriented cells 2*a* or the vertically-oriented cells 2*b* are greater in number. However, the library device having the above-described one aspect may be a library device in which the horizontally-oriented cells 2*a* and the vertically-oriented cells 2*b* approximately equal in number are mixed.

Further, in the above-described first and second embodiments, the drive 3 is a horizontally-oriented drive, but in the library device having the one aspect described above, a horizontally-oriented drive and a vertically-oriented drive may be mixed.

Here, on the basis of the above-described embodiments, possible and preferable features in addition to the above-described one aspect will be described.

In the above-described one aspect of the library device, it is preferable that "the first placement manner is horizontal placement and the second placement manner is vertical placement".

According to this preferable feature, even when among the cells and the medium drive, those containing the storage media in the horizontal position and those containing the storage media in the vertical position are mixed, transfer between these cells and the medium drive is carried out without a hitch.

Further, the above preferable feature may be such a feature that "the movement-controlling system includes: a first guide member that extends in a first direction of a horizontal direction and a vertical direction and guides the support member in the first direction, a second guide member that extends in a second direction of the horizontal direction and the vertical direction and guides the first guide member in the second direction, a first motor that causes the support member to move in the first direction, and a second motor that causes the first guide member to move in the second direction, and the predetermined position is a position fixed to one end portion of the first guide member, and the posture-changing member is provided at the predetermined position of the first guide member and has an abutment section to be abut by the support member proceeding to the predetermined position."

In the library device 100 of the above-mentioned first embodiment, the horizontal-movement motor 9 in FIG. 8A and FIG. 8B is equivalent to an example of the first motor, and the robot base 18 is equivalent to an example of the first guide member. Further, the vertical-movement motor 282 in FIG. 3 is equivalent to an example of the second motor, the two columns 280 are equivalent to an example of the second guide member, the front wall 18*b* in FIG. 14A through FIG. 14D is equivalent to an example of the abutment section. In this way, in the library device 100 of the first embodiment, the above feature in which the abutment section is provided is realized.

Moreover, in the above feature in which the abutment section is provided, it is further preferable that "the support member includes: a first support member that supports the housing section pivotably and is driven by the first motor, a second support member that is mounted with the first support member and abuts the abutment section when being guided by the first guide member and proceeding to the predetermined position, and a second biasing member that biases the first support member on the second support member in a direction of going away from the predetermined position, and when the housing section proceeds to the predetermined position, the second support member is prevented from further proceeding by abutting the abutment section, and the first support member further proceeds by resisting biasing by the second biasing member and the housing section pivots from the first posture to the second posture by receiving interference with the posture-changing member".

According to such a feature, the support member is moved in the first direction by the first motor and moved in the second direction by the second motor. Here, movement of the support member in the first direction is performed when a driving force of the first motor is received by the first support member of the support member, and in this movement, when the second support member of the support member is prevented from moving by abutting the abutment section, the housing section pivots from the first posture to the second posture by receiving interference with the posture-changing member. In such a feature, change from the first posture to the second posture is easily realized by the abutment of the second support member on the abutment section and the interference of the posture-changing member with the housing section, during the movement of the support member in the first direction. In the library device 100 of the above-described first embodiment, the hand base 10 is equivalent to an example of the first support member, and the plate 15 is equivalent to an example of the second support member. In fact, in the first embodiment, when the plate 15 is prevented from moving by contacting the front wall 18*b*, the lock pin 16 in FIG. 14A through FIG. 14D is released from the hand section 6, and further, the pin 13 is depressed by the side wall 18*a* and thereby the hand section 6 is changed from the horizontally-oriented posture to the vertically-oriented posture. In this way, in the first embodiment, the above-described further preferable feature is realized.

Further, in the above-described one aspect of the library device, it is also preferable that "the posture-changing member is provided in the frame, and the medium-transferring unit further includes: a locking member that is supported by the support member, and maintains the housing section in the second posture by locking the housing section that is in the second posture upon pivoting from the first posture by receiving the interference with the posture-changing member when the housing section moves to the predetermined position, and a locking release member that is provided in the frame, and interferes with the locking member moving with the support member, thereby releasing locking of the housing section by the locking member."

According to such a preferable feature, the housing section is maintained in the second posture by the locking member, and the housing section is returned from the second posture to the first posture by the lock release member and the biasing member of the one aspect. In such a feature, change from the second posture to the first posture is easily realized by release of the locking of the housing member while the support member is moving. In the library device 200 of the above-described second embodiment, the locking arm 25 is equivalent to an example of the locking member, and the block 29 is equivalent to an example of the locking release member. In fact, in the second embodiment, as described above with reference to FIG. 23 and FIG. 24, the hook-shaped tip 25a of the locking arm 25 contacts the block 29 while the hand section 20 is moving, and thereby engagement between the hook-shaped tip 25a of the locking arm 25 and the pin 24 of the hand section 20 is released and the hand section 20 is changed from the vertically-oriented posture to the horizontally-oriented posture. In this way, in the above-described second embodiment, the preferable feature in which the locking member is provided is realized.

According the exemplary embodiments including the one aspect of the invention, the housing section of the medium-transferring unit takes the second posture when receiving interference by an interface member and takes the first posture when not receiving interference by the interference member. Therefore, the housing section may change the posture depending on whether the storage media are in the first placement manner or in the second placement manner. For this reason in the one aspect of the invention, even when the cells and the medium drives that contain the storage media in the first placement manner or the cells and the medium drives that contain the storage media in the second placement manner are mixed in order to densely arrange the cells and medium drives, the transfer of the storage media between the cells or the medium drives is carried out without a hitch. Moreover, the change in the posture is determined based on whether or note the housing section moves to the predetermined position and thus, there is no need to separately provide a drive system for changing the posture and a control system for the drive system. For this reason, in the one aspect of the invention, an increase in cost to be caused by providing the drive system and the control system is avoided.

AS explained above, according to the exemplary embodiments including the one aspect of the invention, a library device in which a size increase and a cost increase are avoided while keeping a large amount of information is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library device comprising:
   a frame;
   a plurality of cells provided in the frame and each containing a storage medium removably in at least one of a first placement manner and a second placement manner different from the first placement manner;
   a medium drive provided in the frame and accessing the storage medium contained in the cell; and
   a medium-transferring unit that includes a housing section housing the storage medium removably, and moves the housing section between the plurality of cells and the medium drive, thereby transferring the storage medium between the plurality of cells and the medium drive, wherein
   the medium drive contains the storage medium in a second-type placement manner different from a first-type placement manner that is, of the first placement manner and the second placement manner, a manner of placing a storage medium contained in at least one of the plurality of cells, and
   the medium-transferring unit further includes:
      a support member that supports the housing section pivotably between a first posture in which the housing section houses the storage medium in one of the first placement manner and the second placement manner and a second posture in which the housing section houses the storage medium in the other of the first placement manner and the second placement manner;
      a movement-controlling system that causes the support member to move to a position where the housing section faces each of the plurality of cells and the medium drive;
      a medium-transferring system that transfers the storage medium between each of the plurality of cells and the housing section and between the medium drive and the housing section;
      a biasing member that biases the housing section to be in the first posture; and
      a posture-changing member that interferes with the housing section when the housing section moves and reaches a predetermined position, and causes the housing section to pivot from the first posture to the second posture by resisting a biasing force produced by the biasing member.

2. The library device according to claim 1, wherein the first placement manner is horizontal placement and the second placement manner is vertical placement.

3. The library device according to claim 2, wherein
   the movement-controlling system includes:
   a first guide member that extends in a first direction of a horizontal direction and a vertical direction and guides the support member in the first direction;
   a second guide member that extends in a second direction of the horizontal direction and the vertical direction and guides the first guide member in the second direction;
   a first motor that causes the support member to move in the first direction; and
   a second motor that causes the first guide member to move in the second direction, and
   the predetermined position is a position fixed to one end portion of the first guide member, and the posture-changing member is provided at the predetermined position of the first guide member and has an abutment section to be abutted by the support member proceeding to the predetermined position.

4. The library device according to claim 3, wherein
   the support member includes:
   a first support member that supports the housing section pivotably and is driven by the first motor;
   a second support member that is mounted with the first support member and abuts the abutment section when being guided by the first guide member and proceeding to the predetermined position; and
   a second biasing member that biases the first support member on the second support member in a direction of going away from the predetermined position, and
   when the housing section proceeds to the predetermined position, the second support member is prevented from further proceeding by abutting the abutment section, and the first support member further proceeds by resisting biasing by the second biasing member and the housing section pivots from the first posture to the second posture by receiving interference with the posture-changing member.

5. The library device according to claim 1, wherein the posture-changing member is provided in the frame, and the medium-transferring unit further includes:
a locking member that is supported by the support member, and maintains the housing section in the second posture by locking the housing section that is in the second posture upon pivoting from the first posture by receiving the interference with the posture-changing member when the housing section moves to the predetermined position; and
a locking release member that is provided in the frame, and interferes with the locking member moving with the support member, thereby releasing locking of the housing section by the locking member.

* * * * *